US012318039B2

(12) United States Patent
Masek et al.

(10) Patent No.: US 12,318,039 B2
(45) Date of Patent: *Jun. 3, 2025

(54) ADJUSTABLE WARMING RACKS FOR COOKBOXES OF GRILLS

(71) Applicant: Weber-Stephen Products LLC, Palatine, IL (US)

(72) Inventors: Douglas W. Masek, Palatine, IL (US); James Keclik, McHenry, IL (US); Michael A. Graef, Aurora, IL (US); Brian Mathews, Sycamore, IL (US); Nathan Mellas, Lenoir City, TN (US); Nicholas M. Nanos, Jr., Crystal Lake, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,700

(22) Filed: May 23, 2024

(65) Prior Publication Data
US 2024/0306851 A1 Sep. 19, 2024

Related U.S. Application Data

(63) Continuation of application No. 17/472,271, filed on Sep. 10, 2021, now Pat. No. 12,029,349.

(60) Provisional application No. 63/203,923, filed on Aug. 4, 2021, provisional application No. 63/120,535, filed on Dec. 2, 2020.

(51) Int. Cl.
A47J 37/07 (2006.01)

(52) U.S. Cl.
CPC .... *A47J 37/0786* (2013.01); *A47J 2037/0795* (2013.01)

(58) Field of Classification Search
CPC .............. A47J 37/0786; A47J 2037/0795
See application file for complete search history.

(56) References Cited

U.S. PATENT DOCUMENTS

| 4,621,608 | A  | 11/1986 | Lee |
| 4,667,652 | A  | 5/1987  | Bunton |
| 6,357,344 | B2 | 3/2002  | O'Grady et al. |
| 9,131,801 | B2 | 9/2015  | Chung |
| 10,105,007 | B2 | 10/2018 | Colston et al. |
| 10,292,531 | B1 | 5/2019  | Hancock et al. |

(Continued)

FOREIGN PATENT DOCUMENTS

| CA | 1232803 A    | 2/1988  |
| CA | 2548037 A1   | 11/2007 |

(Continued)

OTHER PUBLICATIONS

European Patent Office, "Extended European Search Report," issued in connection with European Patent Application No. 21901219.2, dated Sep. 26, 2024, 8 pages.

(Continued)

*Primary Examiner* — Alfred Basichas
(74) *Attorney, Agent, or Firm* — Avantech Law, LLP

(57) ABSTRACT

Example adjustable warming racks for cookboxes of grills are disclosed. An example warming rack is configured to be coupled to a cookbox of a grill. The example warming rack includes a first rack and a second rack. The first rack is couplable to the cookbox. The second rack is pivotally coupled to the first rack. The second rack is movable relative to the first rack to transition the warming rack between an expanded configuration and a collapsed configuration.

30 Claims, 29 Drawing Sheets

(56) References Cited

U.S. PATENT DOCUMENTS

| | | | |
|---|---|---|---|
| 10,568,461 | B2 | 2/2020 | Colston et al. |
| 12,029,349 | B2 * | 7/2024 | Masek ................ A47J 37/0786 |
| 2009/0293739 | A1 | 12/2009 | Poiret |
| 2013/0112088 | A1 | 5/2013 | May |
| 2013/0247898 | A1 | 9/2013 | Balcerzak et al. |
| 2017/0238759 | A1 | 8/2017 | Prior et al. |
| 2019/0053663 | A1 | 2/2019 | Lee |
| 2019/0053665 | A1 | 2/2019 | Hofer |
| 2019/0290065 | A1 | 9/2019 | Ebersold et al. |
| 2019/0343331 | A1 | 11/2019 | Dahle et al. |
| 2020/0163490 | A1 | 5/2020 | Winter et al. |

FOREIGN PATENT DOCUMENTS

| | | | |
|---|---|---|---|
| CN | 102378592 | A | 3/2012 |
| CN | 107468082 | A | 12/2017 |
| CN | 207768206 | U | 8/2018 |
| CN | 208864110 | U | 5/2019 |
| CN | 209518766 | U | 10/2019 |
| CN | 211657982 | U | 10/2020 |
| DE | 102012204236 | A1 | 9/2013 |
| EP | 2639515 | A1 * | 9/2013 ............ A47J 37/067 |
| EP | 1849388 | B1 | 9/2016 |
| EP | 3443878 | B1 | 2/2019 |
| KR | 930019295 | U | 9/1993 |
| KR | 940003259 | Y1 | 5/1994 |
| KR | 200380809 | Y1 | 4/2005 |
| KR | 200400125 | Y1 | 11/2005 |
| WO | 2021158240 | A1 | 11/2012 |

OTHER PUBLICATIONS

International Searching Authority, "International Search Report and Written Opinion," issued in connection with International Patent Application No. PCT/US2021/054226, dated Jan. 26, 2022, 10 pages.

Taiwan Intellectual Property Office, "Office Action and Search Report," in connection with Taiwanese Patent Application No. 110139509, dated May 31, 2023, 9 pages.

International Bureau, "International Preliminary Report on Patentability," issued in connection with International Patent Application No. PCT/US2021/054226, dated Jun. 15, 2023, 7 pages.

Taiwan Intellectual Property Office, "Decision of Rejection," issued in connection with Taiwanese Patent Application No. 110139509, dated Aug. 21, 2023, 4 pages.

Australian Government, IP Australia, "Examination Report No. 1," issued in connection with Australian Patent Application No. 2021392592, dated Nov. 13, 2023, 3 pages.

Australian Government, IP Australia, "Examination Report No. 2," issued in connection with Australian Patent Application No. 2021392592, dated Mar. 28, 2024, 7 pages.

Australian Government, IP Australia, "Examination Report No. 3," issued in connection with Australian Patent Application No. 2021392592, dated Apr. 2, 2024, 8 pages.

Canadian Intellectual Property Office, "Office Action," issued in connection with Canadian Patent Application No. 3,178,932, dated Apr. 23, 2024, 5 pages.

United States Patent & Trademark Office, "Restriction Requirement," issued in connection with U.S. Appl. No. 17/472,271, dated Feb. 9, 2024, 5 pages.

United States Patent & Trademark Office, "Non-Final Office Action," issued in connection with U.S. Appl. No. 17/472,271, dated Apr. 23, 2024, 7 pages.

United States Patent & Trademark Office, "Notice of Allowance and Fee(s) Due," issued in connection with U.S. Appl. No. 17/472,271, dated May 22, 2024, 5 pages.

China National Intellectual Property Administration, "Office Action," issued in connection with Chinese Patent Application No. 202180039277.3, dated Jan. 6, 2025, 19 pages (including machine-generated translation).

China National Intellectual Property Administration, "Office Action," issued in connection with Chinese Patent Application No. 202180039277.3, dated Apr. 8, 2025, 18 pages (including machine-generated translation).

* cited by examiner

SECTION A-A

SECTION B-B

ADJUSTABLE WARMING RACKS FOR COOKBOXES OF GRILLS

RELATED APPLICATIONS

This application is a continuation of U.S. patent application Ser. No. 17/472,271, filed Sep. 10, 2021, which claims priority to U.S. Provisional Patent Application No. 63/203,923, filed Aug. 4, 2021, and to U.S. Provisional Patent Application No. 63/120,535, filed Dec. 2, 2020. The entireties of U.S. patent application Ser. No. 17/472,271, U.S. Provisional Patent Application No. 63/203,923, and U.S. Provisional Patent Application No. 63/120,535 are hereby incorporated by reference herein.

FIELD OF THE DISCLOSURE

This disclosure relates generally to warming racks and, more specifically, to adjustable warming racks for cookboxes of grills.

BACKGROUND

Cookboxes of grills (e.g., gas grills, charcoal grills, pellet grills, electric grills, etc.) are conventionally equipped with one or more cooking grate(s) that define a cooking surface. The cooking surface defined by the cooking grate(s) typically fills, covers, and/or occupies the substantial entirety of an upper opening of the cookbox. In some instances, such grills are additionally equipped with a warming rack coupled to a rear wall and/or to right and left sidewalls of the cookbox, with the warming rack being positioned at a vertical elevation and/or height above the vertical elevation and/or height of the cooking grate(s). The warming rack typically has a form factor and/or footprint (e.g., as defined by the width and the depth of the warming rack) that is substantially smaller than (e.g., less than half of) the form factor and/or footprint of the cooking grate(s) (e.g., as defined by the width(s) and the depth(s) of the cooking grate(s)).

Known warming racks for cookboxes of grills are typically configured such that the warming rack is stationary relative to the cookbox, with the warming rack having a fixed, non-adjustable form factor and/or footprint. Such stationary, non-adjustable warming rack implementations can negatively impact the user experience associated with the grill itself, and/or with various cooking operations to be performed using the grill. For example, a user may find the form factor and/or footprint of the warming rack to be too small to adequately support one or more food item(s) that the user would like to place on the warming rack. The stationary, non-adjustable form factor and/or footprint of the warming rack typically leaves the user with no recourse by which to expand the form factor and/or footprint of the warming rack to adequately support the desired food item(s). As another example, a user may find the form factor and/or footprint of the warming rack to be obstructive and/or too large with regard to one or more food item(s) that the user would like to place on the cooking gate(s) of the grill located below the warming rack. Aside from the less-than-ideal option of physically removing the warming rack from the cookbox of the grill, the stationary, non-adjustable form factor and/or footprint of the warming rack typically leaves the user with no other recourse by which to reduce the form factor and/or footprint of the warming rack relative to the cooking grate(s) to provide adequate clearance for the desired food item(s).

Figure 1:
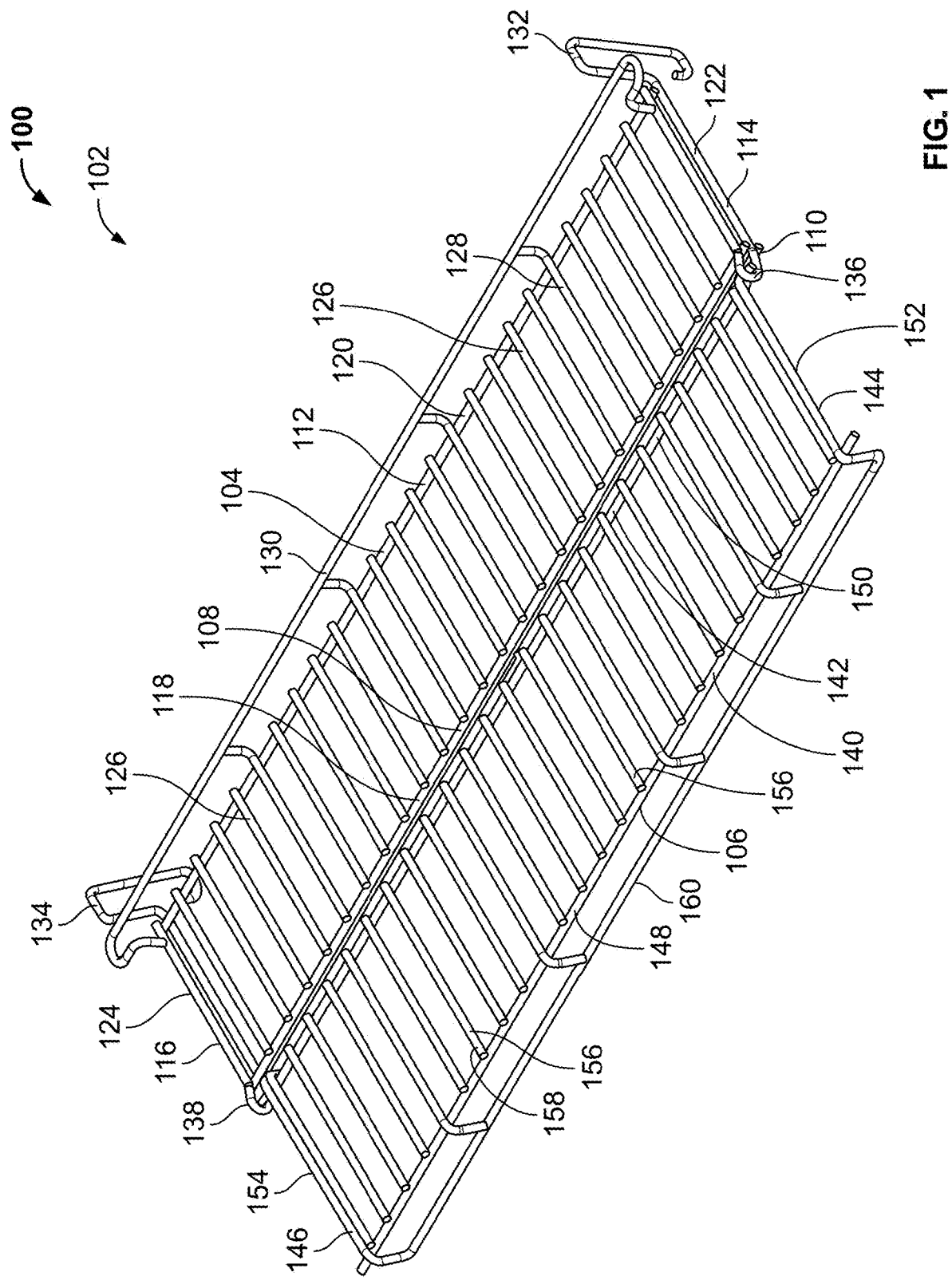
FIG. 1 is a perspective view of an example warming rack constructed in accordance with teachings of this disclosure, with the warming rack shown positioned in an example expanded configuration.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for case of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for case of referencing multiple elements or components.

DETAILED DESCRIPTION

Example adjustable warming racks disclosed herein are advantageously configured to be positionable and/or arrangeable in numerous configurations within a cookbox of a grill, with the adjustable warming racks being transitionable from one configuration to another. In some examples, adjustable warming racks disclosed herein are positionable and/or arrangeable in an expanded configuration having an associated horizontal orientation within the cookbox of the grill. Positioning and/or arranging the warming rack in the expanded configuration and its associated horizontal orientation maximizes the usable warming surface of the warming rack, which may be particularly advantageous in instances where a user wants to place a relatively larger sized food item and/or a greater number of food items on the warming rack, and/or in instances where the amount of available vertical clearance space residing above and/or over one or more primary cooking grate(s) of the grill at a location forward of the warming rack is of little or no concern to the user.

In some examples, adjustable warming racks disclosed herein are additionally or alternatively positionable and/or arrangeable in a collapsed configuration having an associated horizontal orientation within the cookbox of the grill. Positioning and/or arranging the warming rack in the collapsed configuration and its associated horizontal orientation reduces the usable warming surface of the warming rack (e.g., relative to the usable warming surface provided via the expanded configuration and its associated horizontal orientation), which may be particularly advantageous in instances where a user wants to place a relatively smaller sized food item and/or a lesser number of food items on the warming rack, and/or in instances where the amount of available vertical clearance space residing above and/or over the primary cooking grate(s) of the grill at a location forward of the warming rack is of moderate concern to the user.

In some examples, adjustable warming racks disclosed herein are additionally or alternatively positionable and/or arrangeable in a collapsed configuration having an associated non-horizontal orientation within the cookbox of the grill. Positioning and/or arranging the warming rack in the collapsed configuration and its associated non-horizontal orientation further reduces and/or eliminates the usable warming surface of the warming rack, which may be particularly advantageous in instances where a user does not want to place any food items on the warming rack, and/or in instances where the amount of available vertical clearance space residing above and/or over the primary cooking grate(s) of the grill at a location forward of the warming rack is of great concern to the user.

Adjustable warming racks disclosed herein accordingly provide enhanced flexibility with regard to the range of cooking operations that can be accommodated and/or performed within a cookbox of a grill. The above-identified features as well as other advantageous features of example adjustable warming racks disclosed herein are further described below in connection with the figures of the application. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object. As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field.

Figure 2:
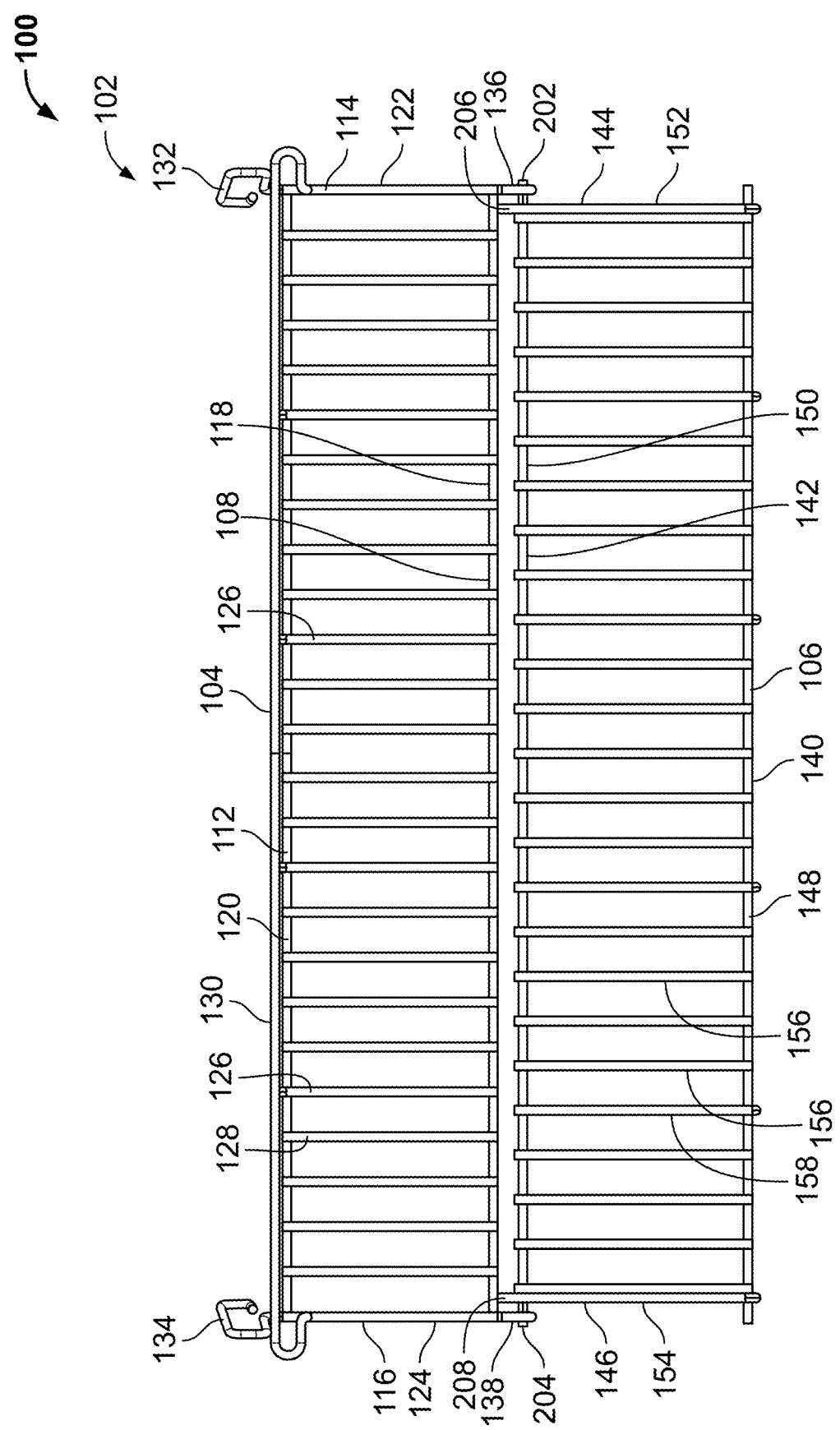
FIG. 2 is a top view of the warming rack of FIG. 1, with the warming rack shown positioned in the expanded configuration of FIG. 1.
Figure 3:
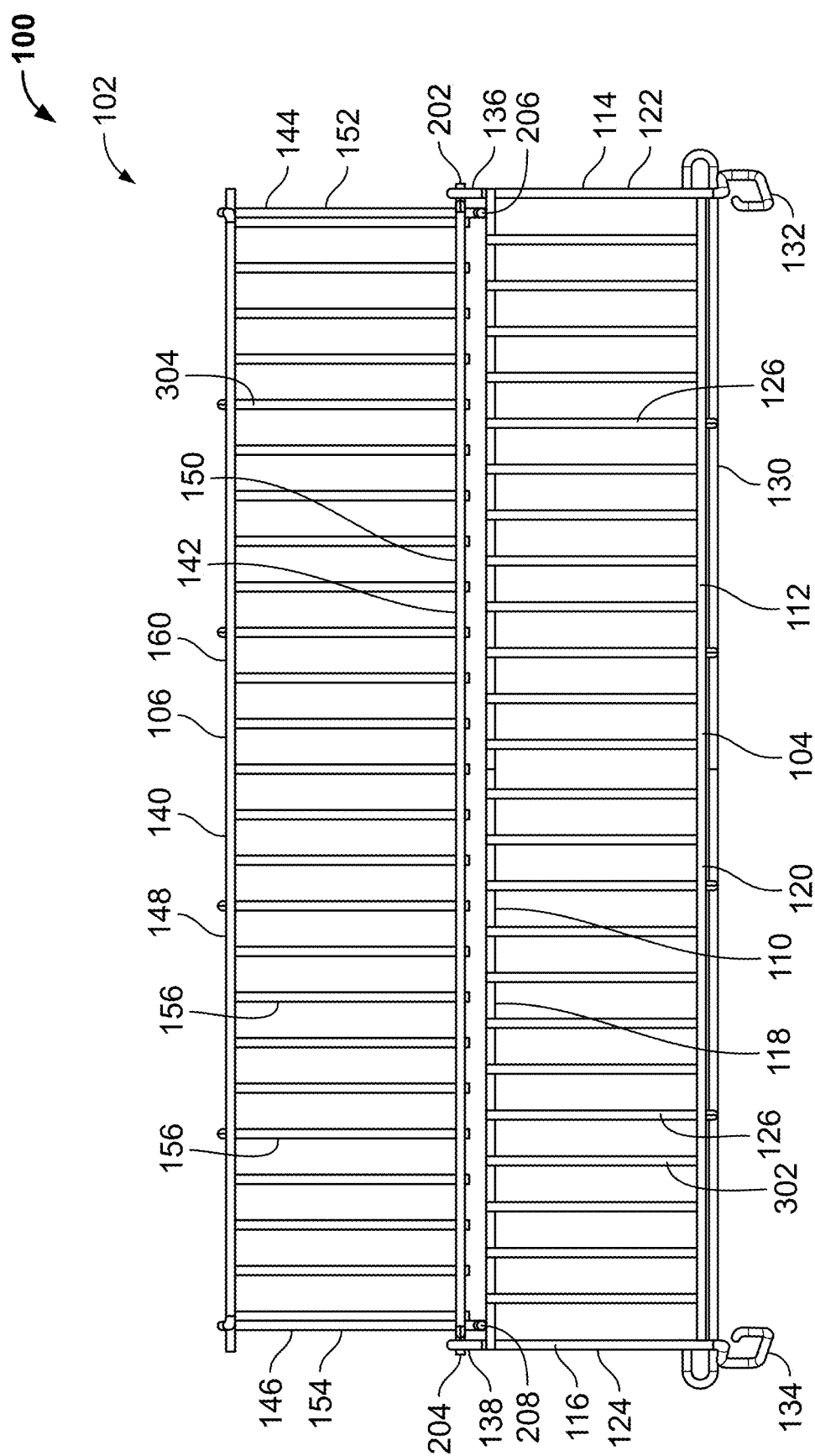
FIG. 3 is a bottom view of the warming rack of FIGS. 1 and 2, with the warming rack shown positioned in the expanded configuration of FIGS. 1 and 2.
Figure 4:
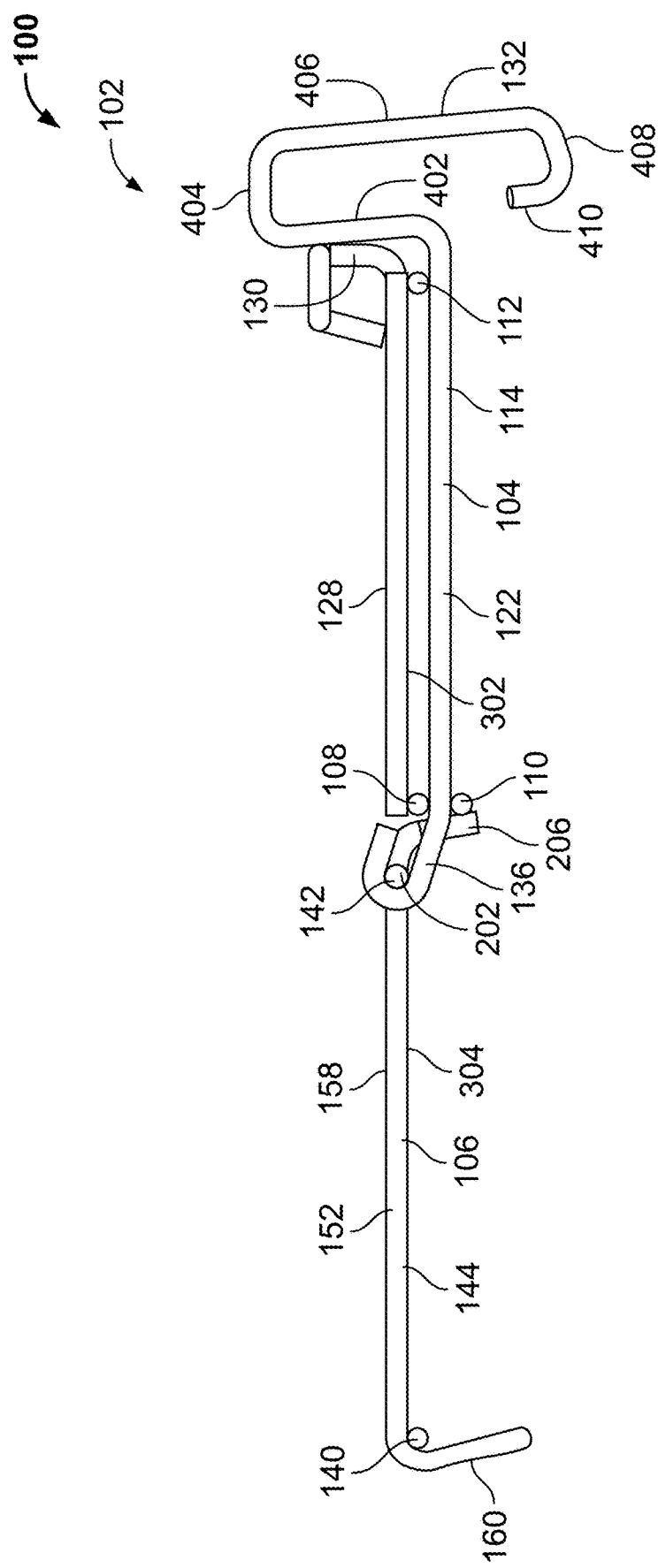
FIG. 4 is a right side view of the warming rack of FIGS. 1-3, with the warming rack shown positioned in the expanded configuration of FIGS. 1-3.

FIG. 1 is a perspective view of an example warming rack 100 constructed in accordance with teachings of this disclosure, with the warming rack 100 shown positioned in an example expanded configuration 102. FIG. 2 is a top view of the warming rack 100 of FIG. 1, with the warming rack 100 shown positioned in the expanded configuration 102 of FIG. 1. FIG. 3 is a bottom view of the warming rack 100 of FIGS. 1 and 2, with the warming rack 100 shown positioned in the expanded configuration 102 of FIGS. 1 and 2. FIG. 4 is a right side view of the warming rack 100 of FIGS. 1-3, with the warming rack 100 shown positioned in the expanded configuration 102 of FIGS. 1-3.

In the illustrated example of FIGS. 1-4, the warming rack 100 includes an example first rack 104 and an example second rack 106 pivotally coupled to the first rack 104. The first rack 104 of FIGS. 1-4 includes an example first support rod 108, an example second support rod 110 located proximate the first support rod 108 of the first rack 104, an example third support rod 112 spaced apart from the first support rod 108 and the second support rod 110 of the first rack 104, an example fourth support rod 114 extending between the first support rod 108 (and/or the second support rod 110) and the third support rod 112 of the first rack 104, and an example fifth support rod 116 spaced apart from the fourth support rod 114 of the first rack 104 and extending between the first support rod 108 (and/or the second support rod 110) and the third support rod 112 of the first rack 104. The first support rod 108 and the second support rod 110 of the first rack 104 collectively define and/or extend along an example front end 118 of the first rack 104. The third support rod 112 of the first rack 104 defines and/or extends along an example rear end 120 of the first rack 104. The fourth support rod 114 of the first rack 104 defines and/or extends along an example right side 122 of the first rack 104. The fifth support rod 116 of the first rack 104 defines and/or extends along an example left side 124 of the first rack 104.

The first rack 104 of FIGS. 1-4 further includes example crosswise rods 126 that respectively extend between (e.g., span) the first support rod 108 (and/or the second support rod 110) and the third support rod 112 of the first rack 104. As shown in FIGS. 1-4, the crosswise rods 126 of the first rack 104 provide and/or define an example top surface 128 of the first rack 104, and further provide and/or define an example bottom surface 302 of the first rack 104 located opposite the top surface 128 of the first rack 104. The crosswise rods 126 of the first rack 104 can be of any shape and/or size, and can form any pattern, layout, framework, and/or configuration. In the illustrated example of FIGS. 1-4, the crosswise rods 126 of the first rack 104 provide and/or define a substantially flat, planar support surface of the first rack 104, with the support surface being configured to support one or more food item(s) thereon.

The first rack 104 of FIGS. 1-4 further includes an example rail 130 extending upwardly from the top surface 128 of the first rack 104 along the rear end 120 of the first rack 104. In the illustrated example of FIGS. 1-4, the rail 130 of the first rack 104 provides and/or defines a rear boundary and/or mechanical stop configured to restrict, block, and/or prevent one or more food item(s) located and/or positioned on the top surface 128 of the first rack 104 from sliding off of the rear end 120 of the first rack 104.

The first rack 104 of FIGS. 1-4 further includes an example first hook 132 and an example second hook 134. In the illustrated example of FIGS. 1-4, the first hook 132 is defined by and/or integrally formed with the fourth support rod 114 of the first rack 104, with the first hook 132 being located and/or positioned rearwardly of the rear end 120 of the first rack 104. Similarly, the second hook 134 is defined by and/or integrally formed with the fifth support rod 116 of the first rack 104, with the second hook 134 also being located and/or positioned rearwardly of the rear end 120 of the first rack 104. In other examples, the first hook 132 can instead be coupled to the fourth support rod 114 of the first rack 104, and the second hook 134 can instead be coupled to the fifth support rod 116 of the first rack 104. In still other examples, the first hook 132 and/or the second hook 134 can instead be integrally formed with and/or coupled to the third support rod 112, the crosswise rods 126, and/or the rail 130 of the first rack 104.

In the illustrated examples of FIGS. 1-4, the first hook 132 is canted relative to the fourth support rod 114 of the first rack 104, with an upper portion of the first hook 132 being located laterally outward relative to the fourth support rod 114, and with a lower portion of the first hook 132 being located laterally inward relative to the fourth support rod 114. Similarly, the second hook 134 is canted relative to the fifth support rod 116 of the first rack 104, with an upper portion of the second hook 134 being located laterally outward relative to the fifth support rod 116, and with a lower portion of the second hook 134 being located laterally inward relative to the fifth support rod 116. Thus, the lower portion of the first hook 132 is separated from the lower portion of the second hook 134 by a distance that is less than a corresponding distance by which the upper portion of the first hook 132 is separated from the upper portion of the second hook 134. In other example, the first hook 132 and the second hook 134 can instead be canted in the opposite direction relative to the fourth support rod 114 and the fifth support rod 116 of the first rack 104, such that the lower portion of the first hook 132 is separated from the lower portion of the second hook 134 by a distance that is greater than a corresponding distance by which the upper portion of the first hook 132 is separated from the upper portion of the second hook 134. In still other examples, the first hook 132 and the second hook 134 can instead be oriented parallel to the fourth support rod 114 and the fifth support rod 116 of the first rack 104, such that the lower portion of the first hook 132 is separated from the lower portion of the second hook 134 by a distance that is substantially equal to a corresponding distance by which the upper portion of the first hook 132 is separated from the upper portion of the second hook 134.

The first hook 132 and the second hook 134 of the first rack 104 of FIGS. 1-4 are respectively configured to couple and/or to mount the first rack 104 and/or, more generally, the warming rack 100 to and/or on a rear wall of a cookbox of a grill. For example, as shown in FIG. 4, the first hook 132 of the first rack 104 includes an example first segment 402 extending upwardly from the top surface 128 of the first rack 104, an example second segment 404 extending rearwardly from the first segment 402, an example third segment 406 extending downwardly from the second segment 404, an example fourth segment 408 extending forwardly from the third segment 406, and an example fifth segment 410 extending upwardly from the fourth segment 408. The first hook 132 of FIGS. 1-4 is configured such that the second segment 404 of the first hook 132 is positioned on and/or over an upper edge of a rear wall of a cookbox when the first rack 104 and/or, more generally, the warming rack 100 of FIGS. 1-4 is coupled and/or mounted to the rear wall of the cookbox with the first rack positioned in a horizontal orientation. The first hook 132 of FIGS. 1-4 is further configured such that the third segment 406 of the first hook 132 is positioned on and/or over an upper edge of a rear wall of a cookbox when the first rack 104 and/or, more generally, the warming rack 100 of FIGS. 1-4 is coupled and/or mounted to the rear wall of the cookbox with the first rack 104 positioned in a non-horizontal orientation (e.g., a substantially vertical orientation). The second hook 134 of the first rack 104 is structured and/or configured in a manner that is substantially identical to the above-described structure and/or configuration of the first hook 132 of the first rack 104.

The first rack 104 of FIGS. 1-4 further includes an example first retention loop 136 and an example second retention loop 138. In the illustrated example of FIGS. 1-4, the first retention loop 136 is defined by and/or integrally formed with the fourth support rod 114 of the first rack 104, with the first retention loop 136 being located and/or positioned forwardly of the front end 118 of the first rack 104. Similarly, the second retention loop 138 is defined by and/or integrally formed with the fifth support rod 116 of the first rack 104, with the second retention loop 138 also being located and/or positioned forwardly of the front end 118 of the first rack 104. In other examples, the first retention loop 136 can instead be coupled to the fourth support rod 114 of the first rack 104, and the second retention loop 138 can instead be coupled to the fifth support rod 116 of the first rack 104. In still other examples, the first retention loop 136 and/or the second retention loop 138 can instead be integrally formed with and/or coupled to the first support rod 108, the second support rod 110, and/or the crosswise rods 126 of the first rack 104.

As further described below, the first retention loop 136 and the second retention loop 138 of the first rack 104 of FIGS. 1-4 are respectively configured to circumferentially bound and/or contain corresponding first and second end portions of a rearwardly-located support rod of the second rack 106, thereby forming a pivotal coupling between the first rack 104 and the second rack 106 of the warming rack 100, with said pivotal coupling enabling the second rack 106 of the warming rack 100 to pivot and/or rotate relative to the first rack 104 of the warming rack 100.

In the illustrated example of FIGS. 1-4, the first support rod 108, the second support rod 110, the third support rod 112, the fourth support rod 114, the fifth support rod 116, the crosswise rods 126, the rail 130, the first hook 132, and the second hook 134 of the first rack 104 respectively have a circular cross-sectional profile. In other examples, the first support rod 108, the second support rod 110, the third support rod 112, the fourth support rod 114, the fifth support rod 116, one or more of the crosswise rod(s) 126, the rail 130, the first hook 132, and/or the second hook 134 of the first rack 104 can instead have a non-circular cross-sectional profile. For example, the first support rod 108, the second support rod 110, the third support rod 112, the fourth support rod 114, the fifth support rod 116, one or more of the crosswise rod(s) 126, the rail 130, the first hook 132, and/or the second hook 134 of the first rack 104 can instead have an elliptical cross-sectional profile, a triangular cross-sectional profile, a rectangular cross-sectional profile, a hexagonal cross-sectional profile, etc.

The second rack 106 of FIGS. 1-4 includes an example first support rod 140, an example second support rod 142 spaced apart from the first support rod 140 of the second rack 106, an example third support rod 144 extending between the first support rod 140 and the second support rod 142 of the second rack 106, and an example fourth support rod 146 spaced apart from the third support rod 144 of the second rack 106 and extending between the first support rod 140 and the second support rod 142 of the second rack 106. The first support rod 140 of the second rack 106 defines and/or extends along an example front end 148 of the second rack 106. The second support rod 142 of the second rack 106 defines and/or extends along an example rear end 150 of the second rack 106. The third support rod 144 of the second rack 106 defines and/or extends along an example right side 152 of the second rack 106. The fourth support rod 146 of the second rack 106 defines and/or extends along an example left side 154 of the second rack 106.

The second rack 106 of FIGS. 1-4 further includes example crosswise rods 156 that respectively extend between (e.g., span) the first support rod 140 and the second support rod 142 of the second rack 106. As shown in FIGS. 1-4, the crosswise rods 156 of the second rack 106 provide and/or define an example top surface 158 of the second rack 106, and further provide and/or define an example bottom surface 304 of the second rack 106 located opposite the top surface 158 of the second rack 106. The crosswise rods 156 of the second rack 106 can be of any shape and/or size, and can form any pattern, layout, framework, and/or configuration. In the illustrated example of FIGS. 1-4, the crosswise rods 156 of the second rack 106 provide and/or define a substantially flat, planar support surface of the second rack 106, with the support surface being configured to support one or more food item(s) thereon.

The second rack 106 of FIGS. 1-4 further includes an example rail 160 extending downwardly from the bottom surface 304 of the second rack 106 along the front end 148 of the second rack 106. In the illustrated example of FIGS. 1-4, the rail 160 of the second rack 106 provides and/or defines a handle configured to assist a user in transitioning the warming rack 100 between the expanded configuration 102 shown in FIGS. 1-4 and a collapsed configuration shown in FIGS. 5-8 and further described below.

In the illustrated example of FIGS. 1-4, the second support rod 142 of the second rack 106 includes an example first end portion 202 extending outwardly from the right side 152 of the second rack 106, and an example second end portion 204 located opposite the first end portion 202 and extending outwardly from the left side 154 of the of the second rack 106. The first end portion 202 of the second support rod 142 of the second rack 106 extends through the first retention loop 136 of the fourth support rod 114 of the first rack 104 such that the first end portion 202 of the second support rod 142 of the second rack 106 is pivotally coupled to, and circumferentially bound by and/or contained within, the first retention loop 136 of the fourth support rod 114 of the first rack 104. Similarly, the second end portion 204 of the second support rod 142 of the second rack 106 extends through the second retention loop 138 of the fifth support rod 116 of the first rack 104 such that the second end portion 204 of the second support rod 142 of the second rack 106 is pivotally coupled to, and circumferentially bound by and/or contained within, the second retention loop 138 of the fifth support rod 116 of the first rack 104. The joints formed by the above-described pivotal coupling of (1) the first end portion 202 of the second rack 106 to the first retention loop 136 of the first rack 104 and (2) the second end portion 204 of the second rack 106 to the second retention loop 138 of the first rack 104 collectively enable the second rack 106 of the warming rack 100 to pivot and/or rotate relative to the first rack 104 of the warming rack 100.

The second rack 106 of FIGS. 1-4 further includes an example first stop arm 206 and an example second stop arm 208. In the illustrated example of FIGS. 1-4, the first stop arm 206 is defined by and/or integrally formed with the third support rod 144 of the second rack 106, with the first stop arm 206 being located and/or positioned downwardly of the bottom surface 304 and/or the rear end 150 of the second rack 106. Similarly, the second stop arm 208 is defined by and/or integrally formed with the fourth support rod 146 of the second rack 106, with the second stop arm 208 also being located and/or positioned downwardly of the bottom surface 304 and/or the rear end 150 of the second rack 106. In other examples, the first stop arm 206 can instead be coupled to the third support rod 144 of the second rack 106, and the second stop arm 208 can instead be coupled to the fourth support rod 146 of the second rack 106. In still other examples, the first stop arm 206 and/or the second stop arm 208 can instead be integrally formed with and/or coupled to the second support rod 142 and/or the crosswise rods 156 of the second rack 106.

In the illustrated example of FIGS. 1-4, the first stop arm 206 and the second stop arm 208 of the second rack 106 respectively provide and/or define pivotal boundaries and/or mechanical stops configured to restrict, block and/or prevent the second rack 106 of the warming rack 100 from pivoting and/or rotating beyond a plane defined by the top surface 128 and/or the bottom surface 302 of the first rack 104 of the warming rack 100. In this regard, the first stop arm 206 and the second stop arm 208 of the second rack 106 are respectively configured to contact the second support rod 110 of the first rack 104 when the warming rack 100 is positioned in the expanded configuration 102 shown in FIGS. 1-4, thereby restricting, blocking, and/or preventing the second rack 106 from further downward rotation relative to the first rack 104.

In the illustrated example of FIGS. 1-4, the first support rod 140, the second support rod 142, the third support rod 144, the fourth support rod 146, the crosswise rods 156, the rail 160, the first end portion 202, the second end portion 204, the first stop arm 206, and the second stop arm 208 of the second rack 106 respectively have a circular cross-sectional profile. In other examples, the first support rod 140, the second support rod 142, the third support rod 144, the fourth support rod 146, one or more of the crosswise rod(s) 156, the rail 160, the first end portion 202, the second end portion 204, the first stop arm 206, and the second stop arm 208 of the second rack 106 can instead have a non-circular cross-sectional profile. For example, the first support rod 140, the second support rod 142, the third support rod 144, the fourth support rod 146, one or more of the crosswise rod(s) 156, the rail 160, the first end portion 202, the second end portion 204, the first stop arm 206, and the second stop arm 208 of the second rack 106 can instead have an elliptical cross-sectional profile, a triangular cross-sectional profile, a rectangular cross-sectional profile, a hexagonal cross-sectional profile, etc.

As shown in FIGS. 1-4, the second rack 106 is located and/or positioned in a side-by-side arrangement relative to the first rack 104 when the warming rack 100 is in the expanded configuration 102. This spatial arrangement advantageously enables the first rack 104 and the second rack 106 to collectively provide a relatively large, planar, and substantially continuous warming surface onto which one or more food item(s) can be placed. In some examples, the warming rack 100 is configured such that the warming surface provided by the first rack 104 and the second rack 106 when the warming rack 100 is in the expanded configuration 102 fills, covers, and/or occupies substantially all of the width, and approximately half of the depth, of a cookbox to which the warming rack 100 is coupled. In this regard, positioning and/or arranging the warming rack 100 in the expanded configuration 102 maximizes the form factor and/or footprint of the useable warming surface provided by the first rack 104 and the second rack 106 of the warming rack 100.

Figure 5:
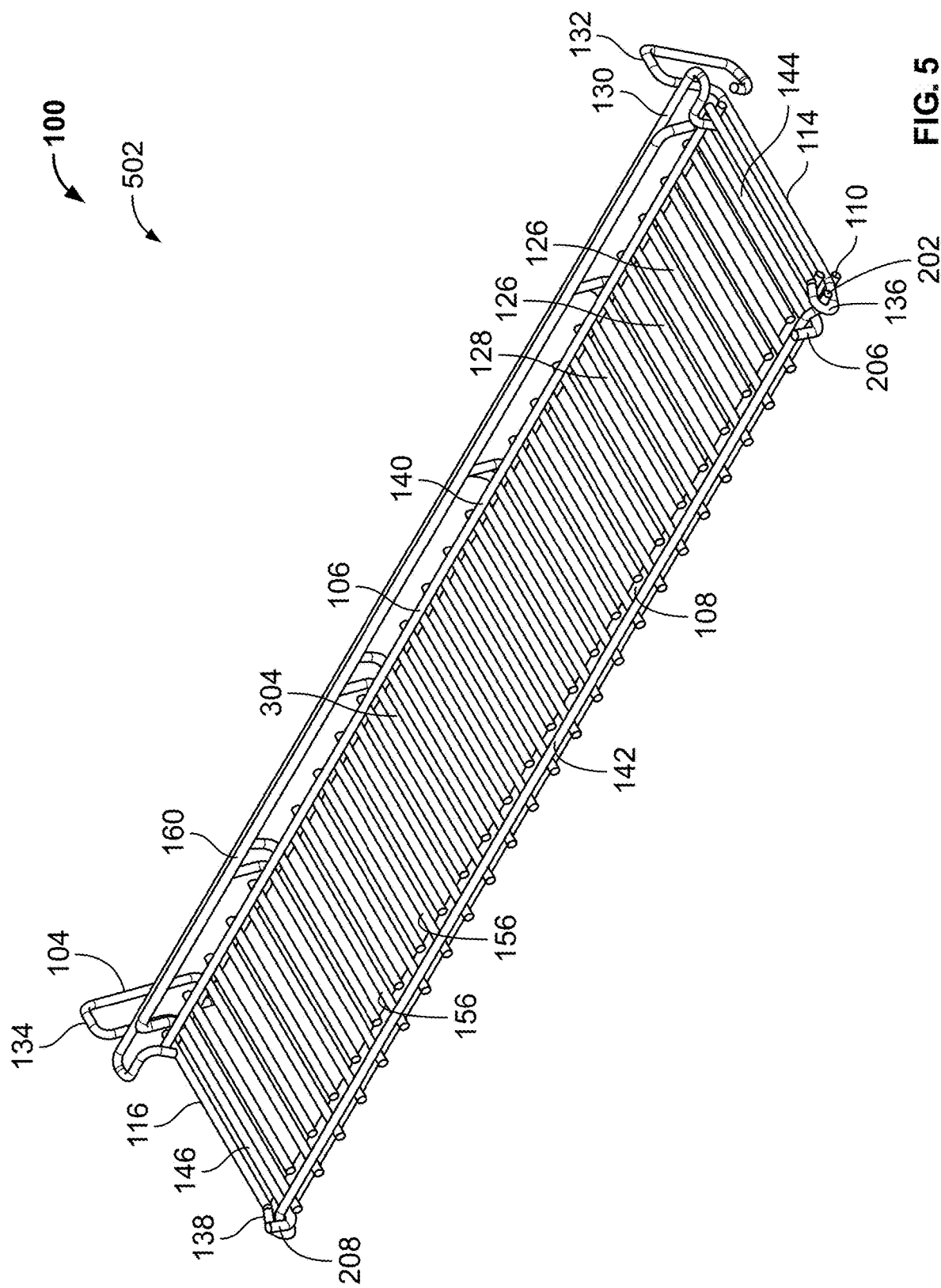
FIG. 5 is a perspective view of the warming rack of FIGS. 1-4, with the warming rack shown positioned in an example collapsed configuration.
Figure 6:
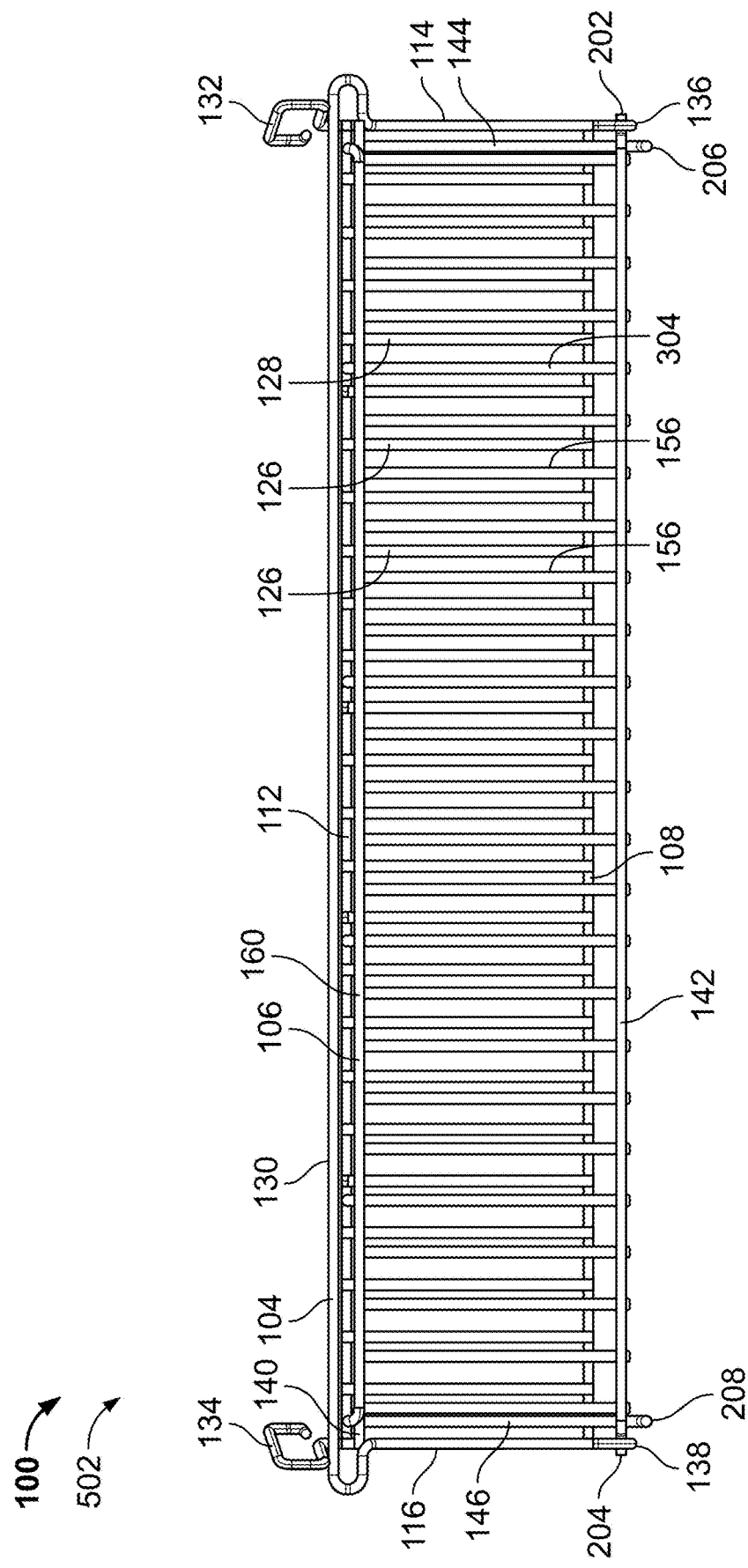
FIG. 6 is a top view of the warming rack of FIGS. 1-5, with the warming rack shown positioned in the collapsed configuration of FIG. 5.
Figure 7:
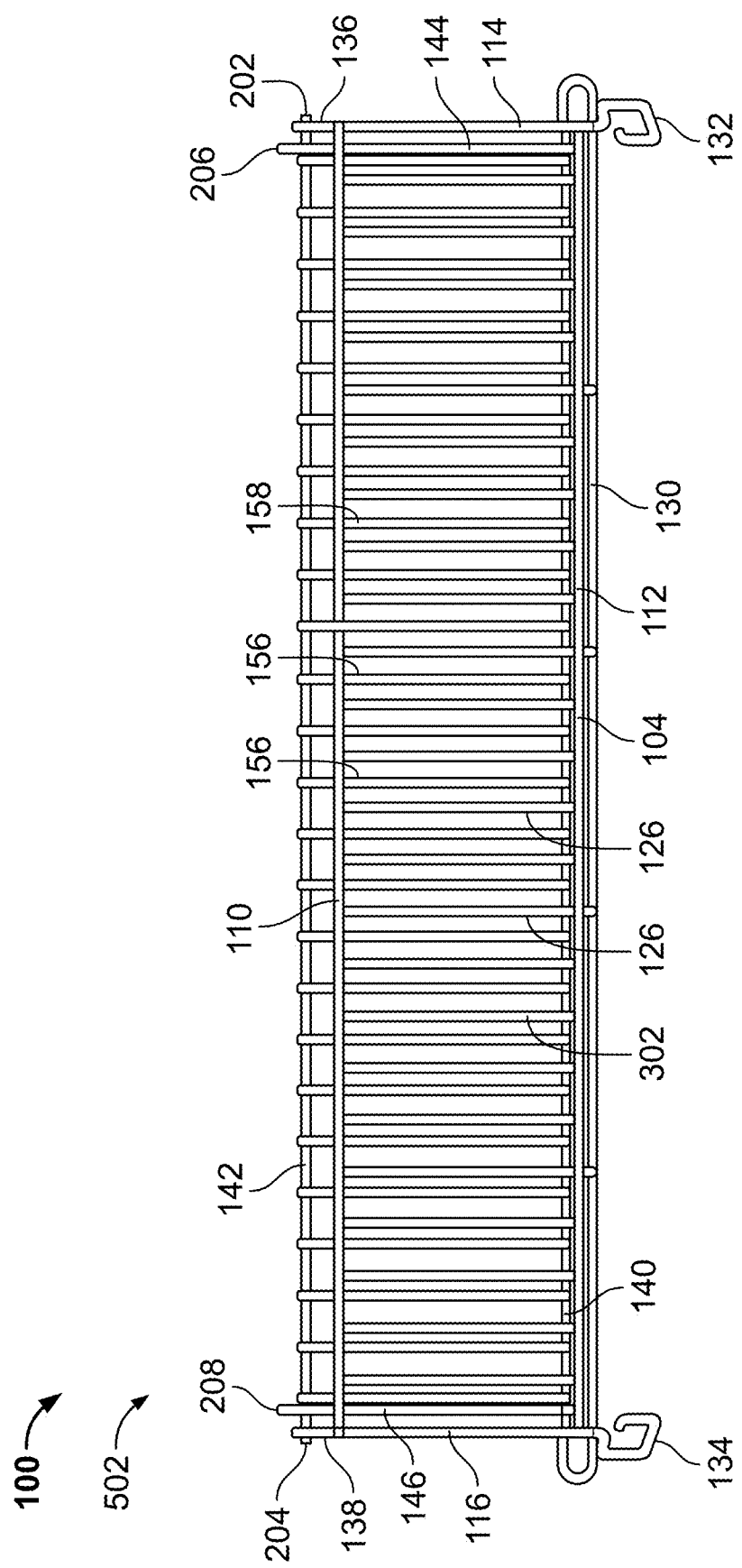
FIG. 7 is a bottom view of the warming rack of FIGS. 1-6, with the warming rack shown positioned in the collapsed configuration of FIGS. 5 and 6.
Figure 8:
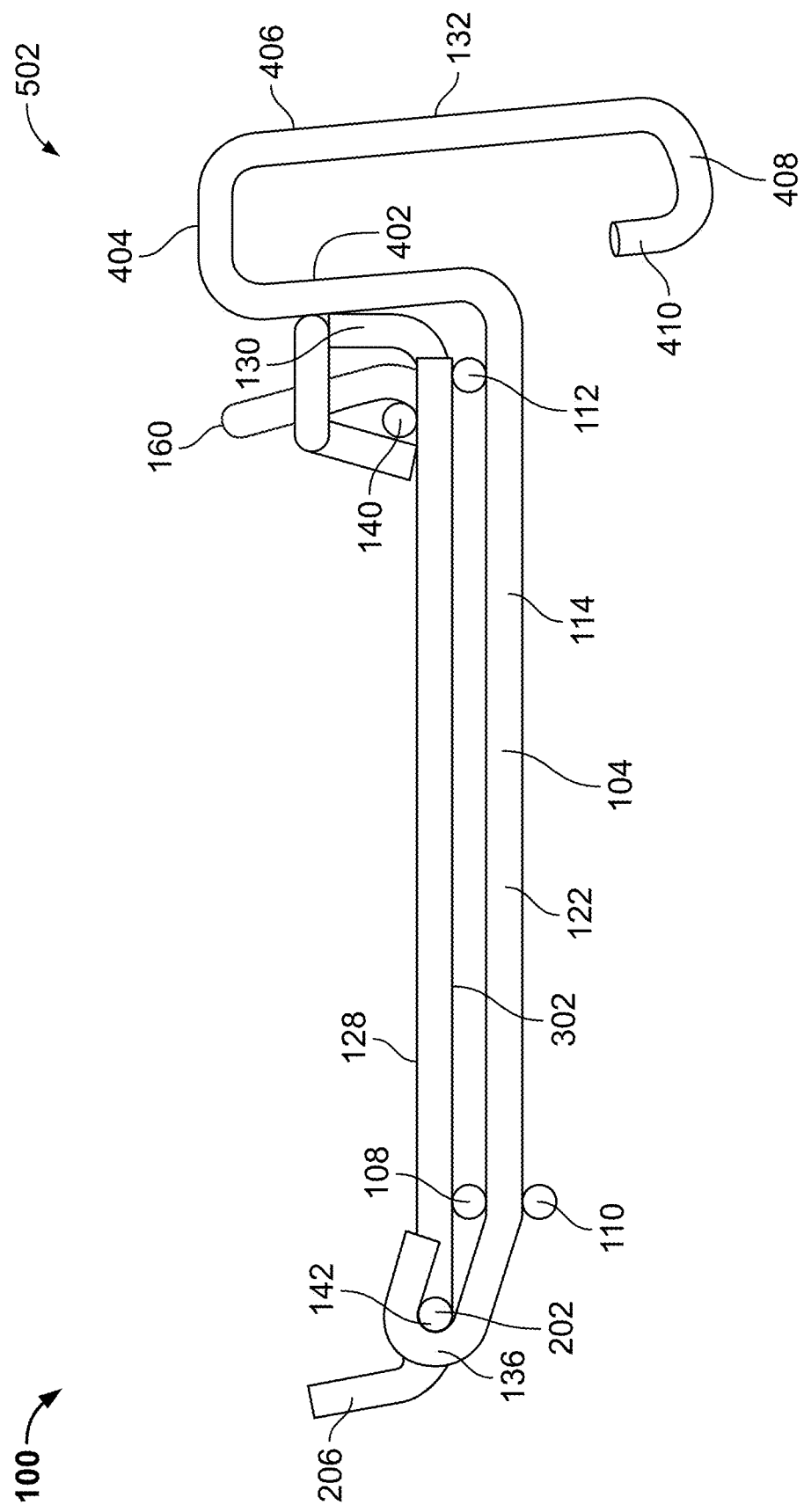
FIG. 8 is a right side view of the warming rack of FIGS. 1-7, with the warming rack shown positioned in the collapsed configuration of FIGS. 5-7.

FIG. 5 is a perspective view of the warming rack 100 of FIGS. 1-4, with the warming rack 100 shown positioned in an example collapsed configuration 502. FIG. 6 is a top view of the warming rack 100 of FIGS. 1-5, with the warming rack 100 shown positioned in the collapsed configuration 502 of FIG. 5. FIG. 7 is a bottom view of the warming rack 100 of FIGS. 1-6, with the warming rack 100 shown positioned in the collapsed configuration 502 of FIGS. 5 and 6. FIG. 8 is a right side view of the warming rack 100 of FIGS. 1-7, with the warming rack 100 shown positioned in the collapsed configuration 502 of FIGS. 5-7.

The warming rack 100 of FIGS. 1-8 can be transitioned (e.g., by a user's hand and/or fingers, or by means of a cooking utensil held by the user) from the expanded configuration 102 shown in FIGS. 1-4 into the collapsed configuration 502 shown in FIGS. 5-8 by pivoting and/or rotating the second rack 106 of the warming rack 100 relative to the first rack 104 of the warming rack 100 such that the top surface 158 of the second rack 106 is placed into a face-to-face arrangement with the top surface 128 of the first rack 104. This spatial arrangement results in the first rack 104 and the second rack 106 collectively providing a planar warming surface onto which one or more food item(s) can be placed, with the provided warming surface associated with the collapsed configuration 502 of the warming rack 100 (e.g., as shown in FIGS. 5-8) being relatively smaller than the corresponding warming surface associated with the expanded configuration 102 of the warming rack 100 (e.g., as shown in FIGS. 1-4). In some examples, the warming rack 100 is configured such that the warming surface provided by the first rack 104 and the second rack 106 when the warming rack 100 is in the collapsed configuration 502 of FIGS. 5-8 fills, covers, and/or occupies substantially all of the width, and less than half (e.g., approximately one-third) of the depth, of a cookbox to which the warming rack 100 is coupled. In this regard, positioning and/or arranging the warming rack 100 in the collapsed configuration 502 shown in FIGS. 5-8 reduces the form factor and/or footprint of the useable warming surface provided by the first rack 104 and the second rack 106 of the warming rack 100 in comparison to the useable warming surface provided by the first rack 104 and the second rack 106 of the warming rack 100 when positioned and/or arranged in the expanded configuration 102 shown in FIGS. 1-4.

The ability of the warming rack 100 of FIGS. 1-8 to be transitioned back and forth between the expanded configuration 102 shown in FIGS. 1-4 and the collapsed configuration 502 shown in FIGS. 5-8 provides advantageous tradeoff possibilities with regard to use of the warming rack 100 in conjunction with a cookbox of a grill to which the warming rack 100 may be coupled. For example, a user may find the form factor and/or footprint of the warming rack 100 when positioned and/or arranged (e.g., within the cookbox of the grill) in the collapsed configuration 502 of FIGS. 5-8 to be too small to adequately support one or more food item(s) that the user would like to place on the warming rack 100. In such instances, the user can transition the warming rack 100 from the collapsed configuration 502 shown in FIGS. 5-8 into the expanded configuration 102 shown in FIGS. 1-4, thereby increasing (e.g., maximizing) the form factor and/or footprint of the usable warming surface of the warming rack 100. As another example, a user may find the form factor and/or footprint of the warming rack 100 when positioned and/or arranged (e.g., within the cookbox of the grill) in the expanded configuration 102 of FIGS. 1-4 to be obstructive and/or too large with regard to one or more food item(s) that the user would like to place on a cooking gate (e.g., positioned within the cookbox of the grill) that may be located below the warming rack 100. In such instances, the user can transition the warming rack 100 from the expanded configuration 102 shown in FIGS. 1-4 into the collapsed configuration 502 shown in FIGS. 5-8, thereby reducing the form factor and/or footprint of the usable warming surface of the warming rack 100 while at the same time increasing the available clearance space residing above and/or over the cooking grate.

Figure 9:
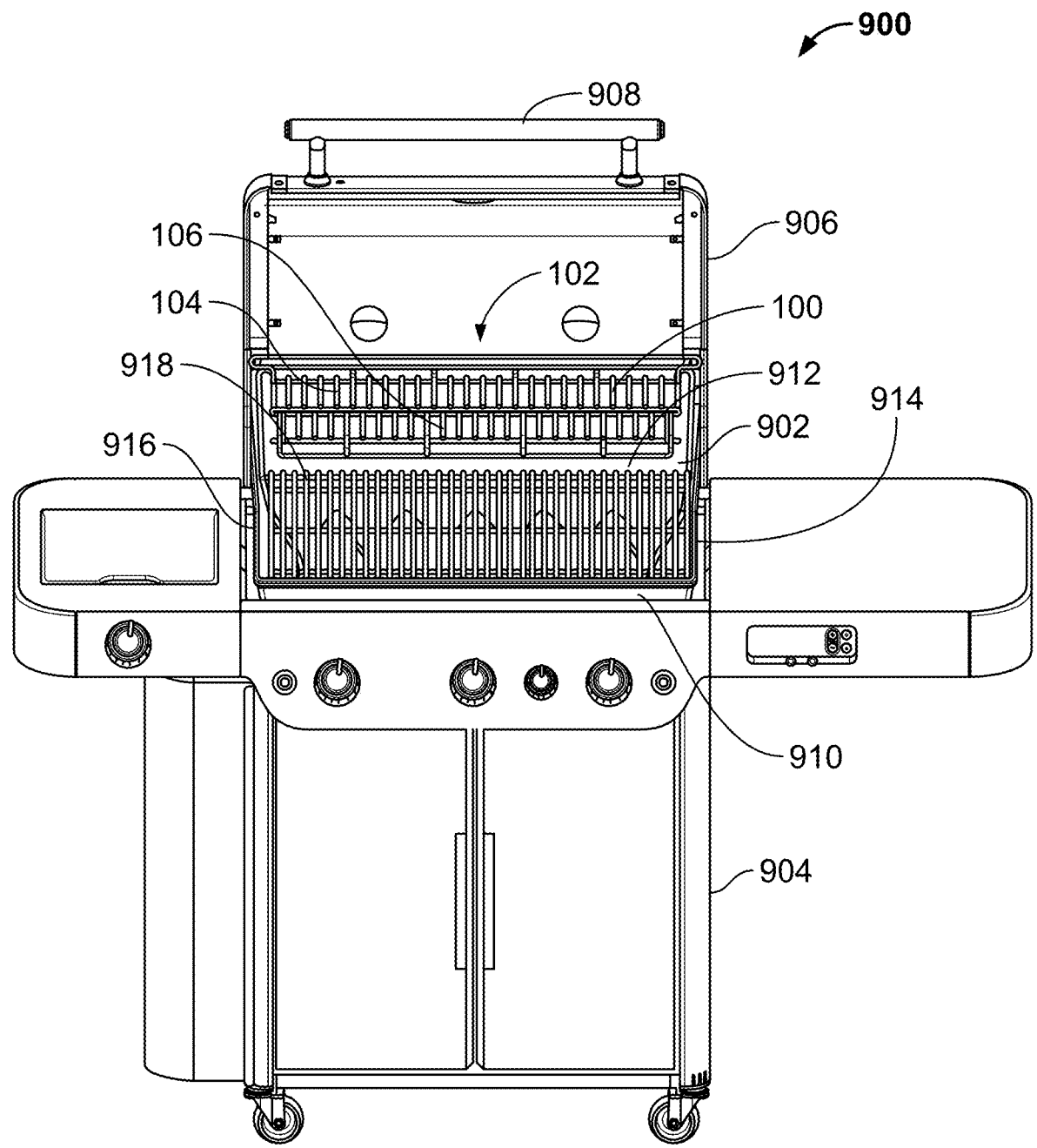
FIG. 9 is a perspective view of an example grill having an example cookbox configured to support the warming rack of FIGS. 1-8.

FIG. 9 is a perspective view of an example grill 900 having an example cookbox 902 configured to support the warming rack 100 of FIGS. 1-8. In the illustrated example of FIG. 9, the warming rack 100 is shown coupled to the cookbox 902, with the warming rack 100 being positioned and/or arranged in the expanded configuration 102 of FIGS. 1-4 described above. The grill 900 of FIG. 9 includes the warming rack 100, the cookbox 902, an example base 904, and an example lid 906. The cookbox 902 of the grill 900 is coupled to, positioned on, and/or supported by the base 904 of the grill 900. The base 904 can be structured as a cart, a storage compartment, a frame, and/or any number of legs that may be suitable to support the cookbox 902. The lid 906 of the grill 900 is movably coupled (e.g., via one or more hinge(s) or pin(s)) to the cookbox 902 of the grill 900 in a manner that enables the lid 906 to be moved (e.g., pivoted and/or rotated) relative to the cookbox 902 between a closed position and an open position (e.g., as shown in FIG. 9). The cookbox 902 and the lid 906 collectively define a cooking chamber of the grill 900 when the lid 906 is in the closed position. Placement of the lid 906 in the open position (e.g., as shown in FIG. 9) enables a user to access the warming rack 100, the cookbox 902, and/or the cooking chamber, as may be required to load, unload, and/or otherwise access a food item located therein or thereon. Movement of the lid 906 between the closed position and the open position can be performed by a user of the grill 900 via an example handle 908 coupled to the lid 906.

The cookbox 902 of the grill 900 can house, carry, and/or otherwise include a heat-generating and/or heat-emitting structure positioned within the cookbox 902. For example, in instances where the grill 900 is a gas grill, the cookbox 902 of the grill 900 can house, carry, and/or otherwise include one or more burner tube(s) configured to generate and/or emit a heat-producing gas flame. As another example, in instances where the grill 900 is a solid-fuel grill (e.g., a charcoal grill, a pellet grill, etc.), the cookbox 902 of the grill 900 can house, carry, and/or otherwise include a burn pot and/or a burn pit configured to generate and/or emit heat from charcoal and/or wood pellets being combusted thereon or therein.

In the illustrated example of FIG. 9, the cookbox 902 includes an example front wall 910, an example rear wall 912 spaced apart from the front wall 910, an example right sidewall 914 extending between the front wall 910 and the rear wall 912, and an example left sidewall 916 spaced apart from the right sidewall 914 and extending between the front wall 910 and the rear wall 912. The warming rack 100 is coupled to the rear wall 912 of the cookbox 902 via the first hook 132 and the second hook 134 of the first rack 104 of the warming rack 100. One or more example cooking grate(s) 918 of the grill 900 is/are located and/or positioned within the cookbox 902 at an elevation and/or height that is below the elevation and/or height at which the warming rack 100 is located and/or positioned within the cookbox 902. The cooking grate(s) 918 is/are configured to form and/or define a substantially flat, planar cooking surface for cooking one or more food item(s) placed thereon. In the illustrated example of FIG. 9, the cooking grate(s) 918 is/are configured to fill, cover, and/or occupy the substantial entirety of the horizontal form factor and/or footprint of the cookbox 902 (e.g., as defined by the width and the depth of the cookbox 902). In other examples, the cooking grate(s) 918 can instead be configured to fill, cover, and/or occupy a relatively smaller portion and/or percentage (e.g., less than the substantial entirety) of the horizontal form factor and/or footprint of the cookbox 902.

Figure 10:
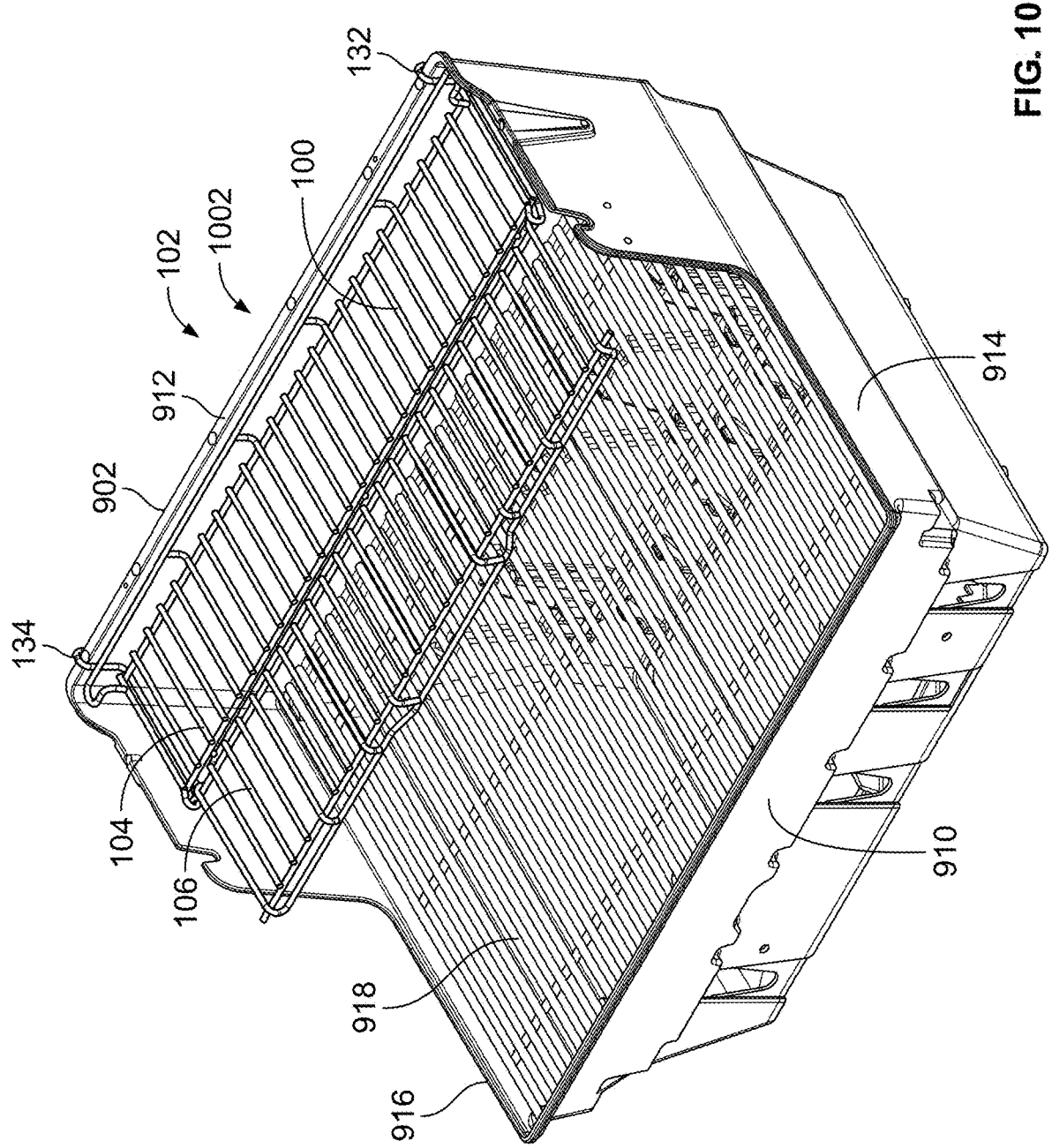
FIG. 10 is a first perspective view of the cookbox of FIG. 9, with the warming rack shown positioned in the expanded configuration of FIGS. 1-4 and further positioned in an example horizontal orientation.
Figure 11:
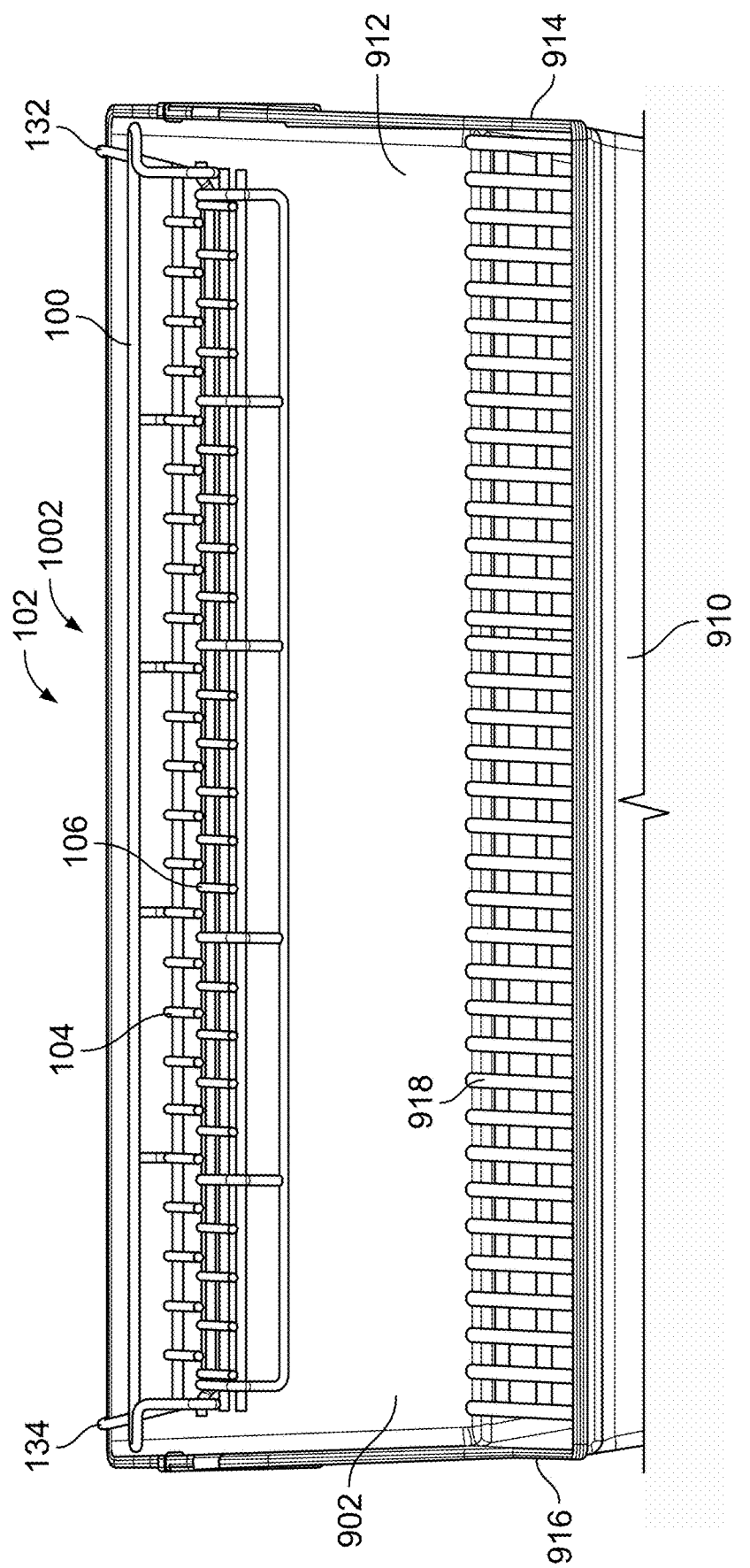
FIG. 11 is a second perspective view of the cookbox of FIGS. 9 and 10, with the warming rack shown positioned in the expanded configuration of FIGS. 1-4 and 10 and the horizontal orientation of FIG. 10.
Figure 12:
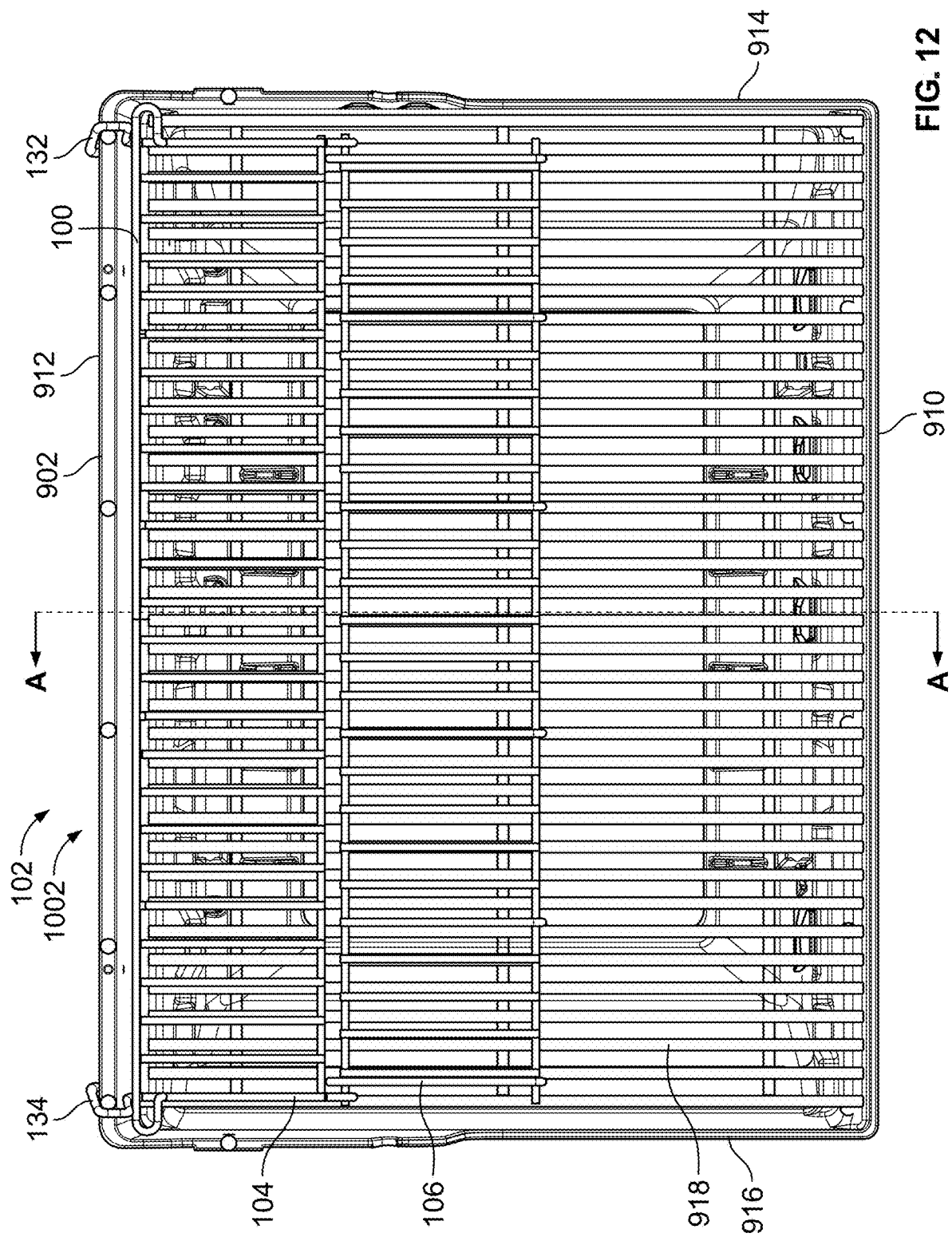
FIG. 12 is a top view of the cookbox of FIGS. 9-11, with the warming rack shown positioned in the expanded configuration of FIGS. 1-4, 10, and 11 and the horizontal orientation of FIGS. 10-11.
Figure 13:
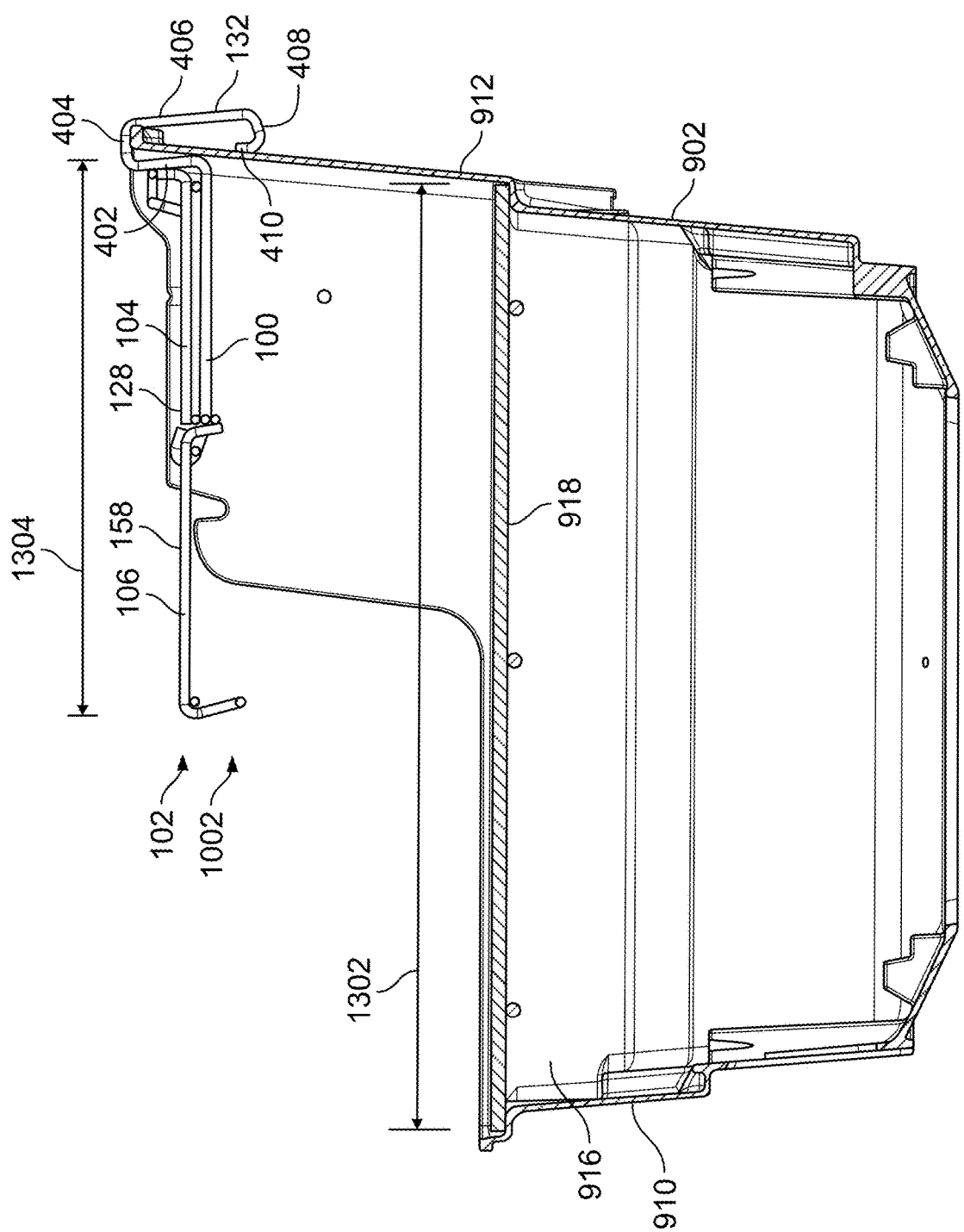
FIG. 13 is a cross-sectional view of the cookbox of FIGS. 9-12 taken along section A-A of FIG. 12, with the warming rack shown positioned in the expanded configuration of FIGS. 1-4 and 10-12 and the horizontal orientation of FIGS. 10-12.

FIG. 10 is a first perspective view of the cookbox 902 of FIG. 9, with the warming rack 100 shown positioned in the expanded configuration 102 of FIGS. 1-4 and further positioned in an example horizontal orientation 1002. FIG. 11 is a second perspective view of the cookbox 902 of FIGS. 9 and 10, with the warming rack 100 shown positioned in the expanded configuration 102 of FIGS. 1-4 and 10 and the horizontal orientation 1002 of FIG. 10. FIG. 12 is a top view of the cookbox 902 of FIGS. 9-11, with the warming rack 100 shown positioned in the expanded configuration 102 of FIGS. 1-4, 10, and 11 and the horizontal orientation 1002 of FIGS. 10-11. FIG. 13 is a cross-sectional view of the cookbox 902 of FIGS. 9-12 taken along section A-A of FIG. 12, with the warming rack 100 shown positioned in the expanded configuration 102 of FIGS. 1-4 and 10-12 and the horizontal orientation 1002 of FIGS. 10-12.

In the illustrated example of FIGS. 10-13, the first rack 104 and/or, more generally, the warming rack 100 is coupled to the rear wall 912 of the cookbox 902 via the first hook 132 and the second hook 134 of the first rack 104. As shown in FIG. 13, the first segment 402 of the first hook 132 is located within the cookbox 902, with the first segment 402 contacting an interior surface of the rear wall 912 of the cookbox 902. The second segment 404 of the first hook 132 is located above the cookbox 902, with the second segment 404 contacting and extending across an upper edge of the rear wall 912 of the cookbox 902. The third segment 406, the fourth segment 408, and the fifth segment 410 of the first hook 132 are respectively located outside of the cookbox 902, with the fifth segment 410 contacting an exterior surface of the rear wall 912 of the cookbox 902. The second hook 134 of the first rack 104 is arranged relative to the rear wall 912 of the cookbox 902 in a manner that is substantially identical to the above-described arrangement of the first hook 132 of the first rack 104 relative to the rear wall 912 of the cookbox 902.

In the illustrated example of FIGS. 10-13, the second rack 106 is located and/or positioned in a side-by-side arrangement relative to the first rack 104, with the second rack 106 being located forward of the first rack 104. This spatial arrangement between the first rack 104 and the second rack 106 advantageously provides a relatively large, planar, and substantially continuous warming surface onto which one or more food item(s) can be placed. The first rack 104 and the second rack 106 are respectively located and/or positioned above the cooking grate(s) 918 that are commonly located within the cookbox 902. The horizontal orientation 1002 of the warming rack 100 as shown in FIGS. 10-13 is defined by the planar top surface 128 of the first rack 104 and/or the planar top surface 158 of the second rack 106. As shown in FIGS. 10-13, the planar top surface 128 of the first rack 104 and/or the planar top surface 158 of the second rack 106 is/are substantially parallel to a horizontal plane defined by the upper surface(s) of the cooking grate(s) 918.

The warming rack 100 of FIGS. 1-13 is configured such that the warming surface provided by the first rack 104 and the second rack 106 when the warming rack 100 is positioned and/or arranged in the expanded configuration 102 and coupled to the cookbox 902 in the horizontal orientation 1002 fills, covers, and/or occupies substantially all of the width, and approximately half of the depth, of the cookbox 902. For example, as shown in FIGS. 10-13, the cooking grate(s) 918 has/have an example depth 1302 within the cookbox 902. The warming rack 100 has an example depth 1304 within the cookbox 902, with the depth 1304 of the warming rack 100 being approximately half of the depth 1302 of the cooking grate(s) 918. Positioning and/or arranging the warming rack 100 in the expanded configuration 102 and the horizontal orientation 1002 shown in FIGS. 10-13 maximizes the form factor and/or footprint of the useable warming surface provided by the first rack 104 and the second rack 106 of the warming rack 100. The spatial arrangement and/or configuration of the warming rack 100 as shown in FIGS. 10-13 can be particularly advantageous in instances where a user wants to place a relatively larger sized food item and/or a greater number of food items on the warming rack 100, and/or in instances where the amount of available vertical clearance space residing above and/or over the cooking grate(s) 918 at a location forward of the warming rack 100 is of little or no concern to the user.

Figure 14:
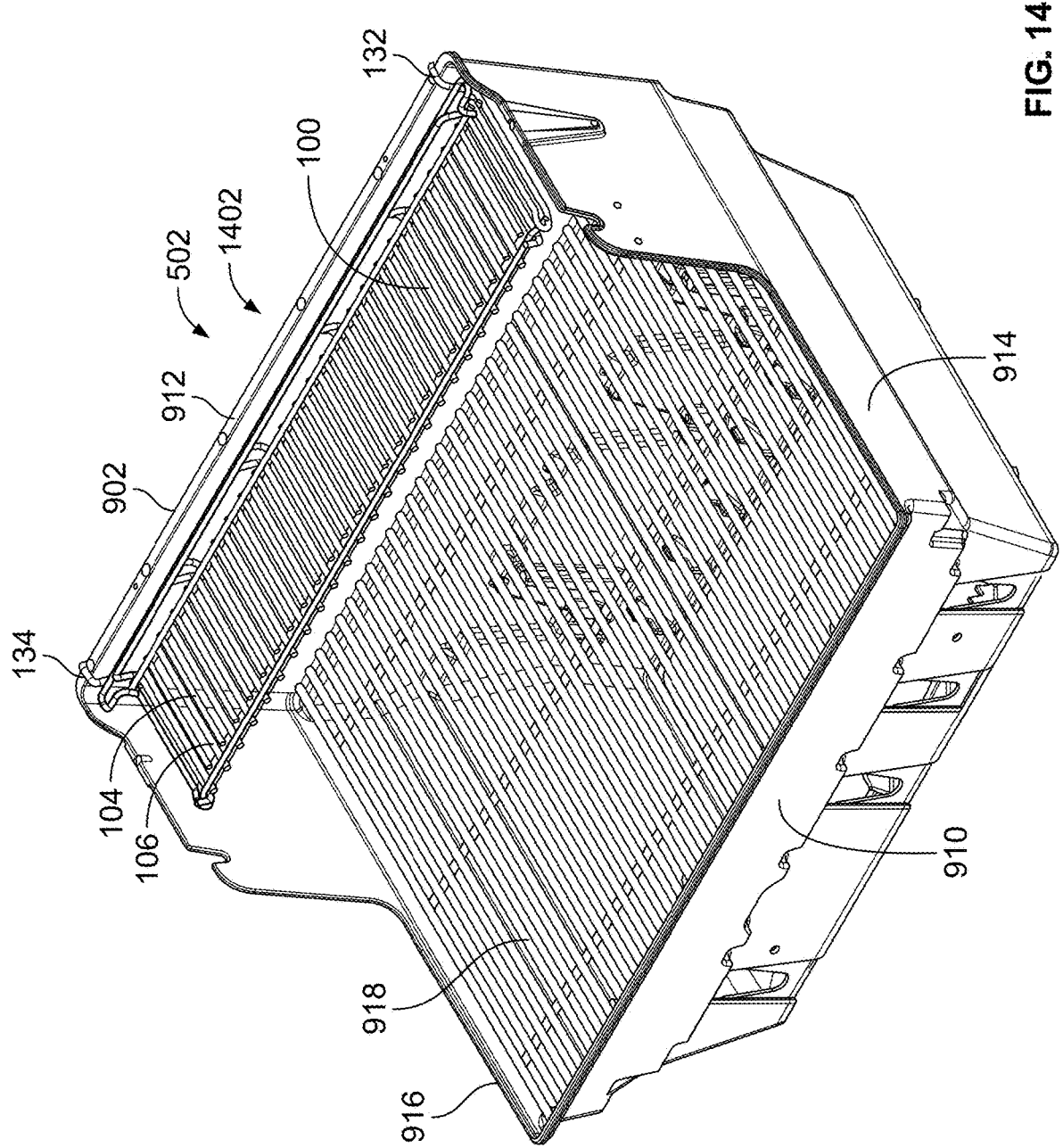
FIG. 14 is a first perspective view of the cookbox of FIG. 9, with the warming rack shown positioned in the collapsed configuration of FIGS. 5-8 and further positioned in an example horizontal orientation.
Figure 15:
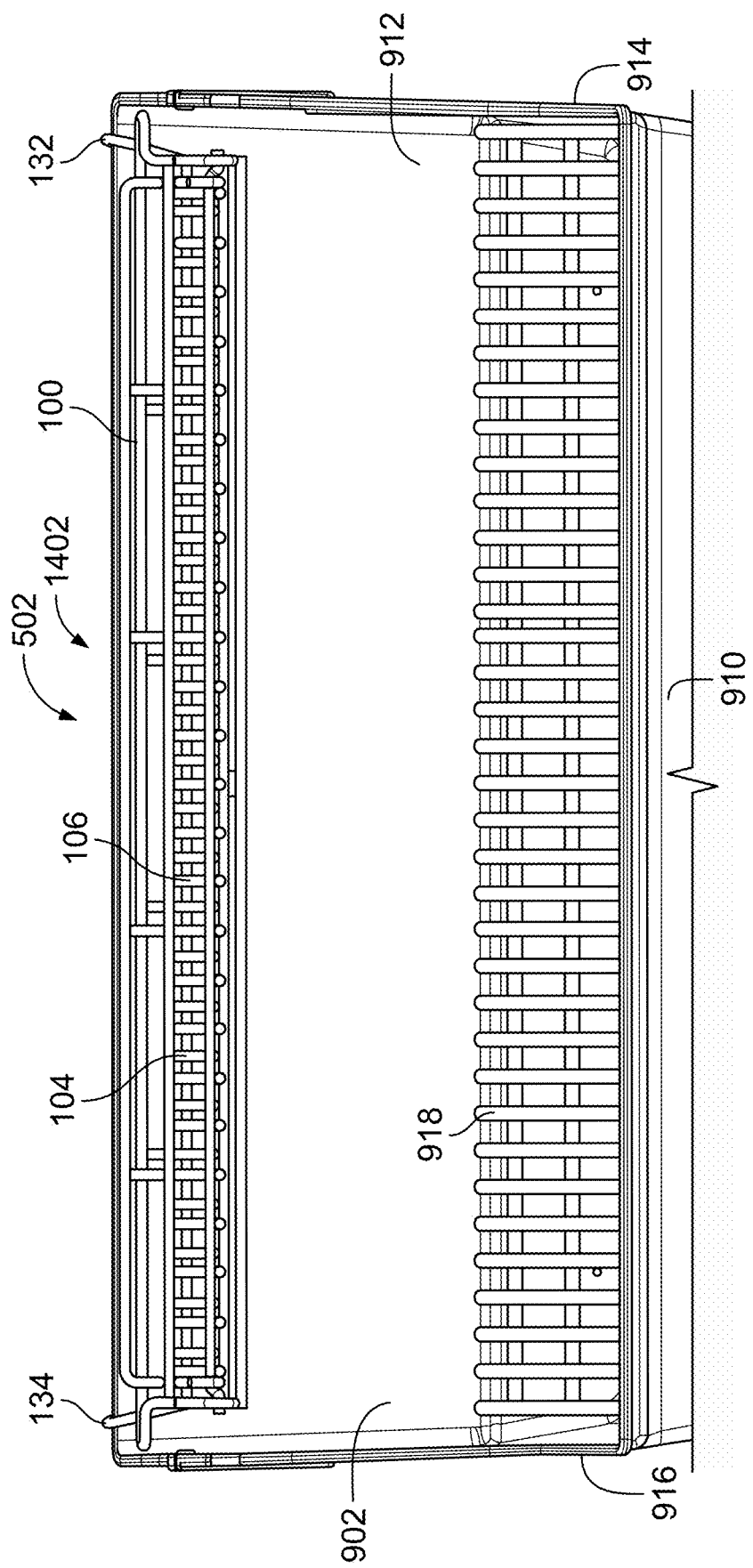
FIG. 15 is a second perspective view of the cookbox of FIGS. 9 and 14, with the warming rack shown positioned in the collapsed configuration of FIGS. 5-8 and 14 and the horizontal orientation of FIG. 14.
Figure 16:
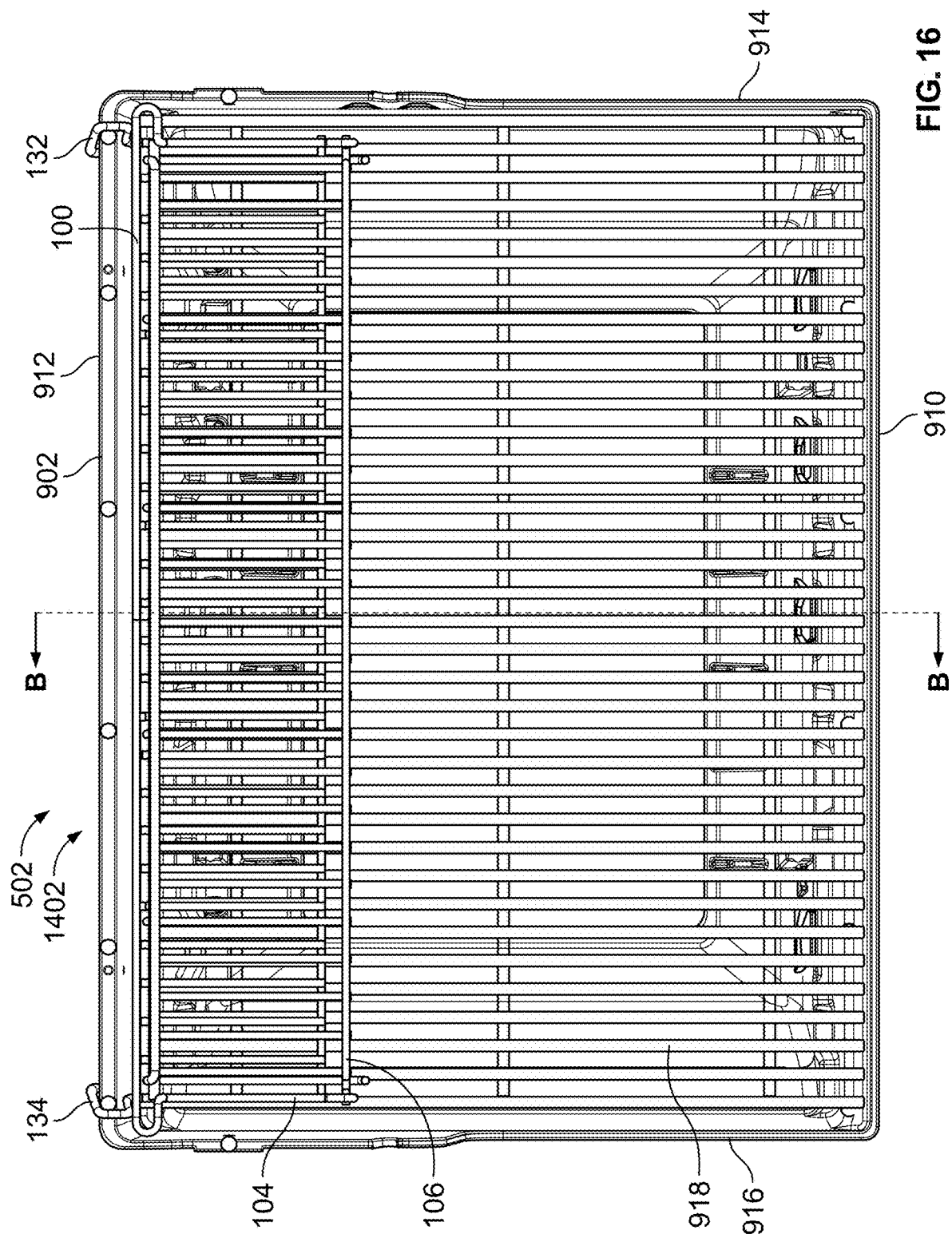
FIG. 16 is a top view of the cookbox of FIGS. 9, 14, and 15, with the warming rack shown positioned in the collapsed configuration of FIGS. 5-8, 14, and 15 and the horizontal orientation of FIGS. 14 and 15.
Figure 17:
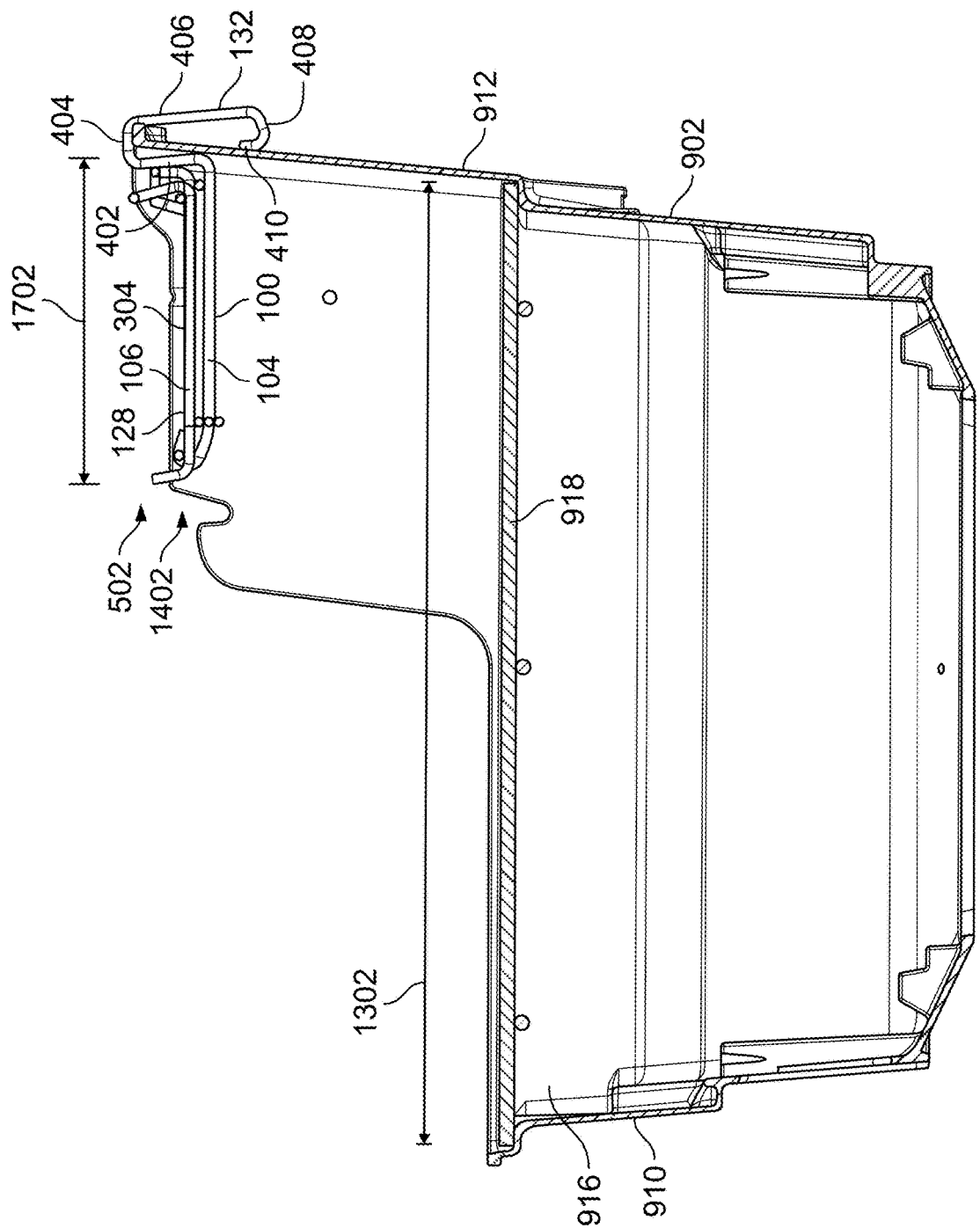
FIG. 17 is a cross-sectional view of the cookbox of FIGS. 9 and 14-16 taken along section B-B of FIG. 16, with the warming rack shown positioned in the collapsed configuration of FIGS. 5-8 and 14-16 and the horizontal orientation of FIGS. 14-16.

FIG. 14 is a first perspective view of the cookbox 902 of FIG. 9, with the warming rack 100 shown positioned in the collapsed configuration 502 of FIGS. 5-8 and further positioned in an example horizontal orientation 1402. FIG. 15 is a second perspective view of the cookbox 902 of FIGS. 9 and 14, with the warming rack 100 shown positioned in the collapsed configuration 502 of FIGS. 5-8 and 14 and the horizontal orientation 1402 of FIG. 14. FIG. 16 is a top view of the cookbox 902 of FIGS. 9, 14, and 15, with the warming rack 100 shown positioned in the collapsed configuration 502 of FIGS. 5-8, 14, and 15 and the horizontal orientation 1002 of FIGS. 14 and 15. FIG. 17 is a cross-sectional view of the cookbox 902 of FIGS. 9 and 14-16 taken along section B-B of FIG. 16, with the warming rack 100 shown positioned in the collapsed configuration 502 of FIGS. 5-8 and 14-16 and the horizontal orientation 1402 of FIGS. 14-16.

In the illustrated example of FIGS. 14-17, the first rack 104 and/or, more generally, the warming rack 100 is coupled to the rear wall 912 of the cookbox 902 via the first hook 132 and the second hook 134 of the first rack 104. As shown in FIG. 17, the first segment 402 of the first hook 132 is located within the cookbox 902, with the first segment 402 contacting an interior surface of the rear wall 912 of the cookbox 902. The second segment 404 of the first hook 132 is located above the cookbox 902, with the second segment 404 contacting and extending across an upper edge of the rear wall 912 of the cookbox 902. The third segment 406, the fourth segment 408, and the fifth segment 410 of the first hook 132 are respectively located outside of the cookbox 902, with the fifth segment 410 contacting an exterior surface of the rear wall 912 of the cookbox 902. The second hook 134 of the first rack 104 is arranged relative to the rear wall 912 of the cookbox 902 in a manner that is substantially identical to the above-described arrangement of the first hook 132 of the first rack 104 relative to the rear wall 912 of the cookbox 902.

In the illustrated example of FIGS. 14-17, the second rack 106 is located and/or positioned in a face-to-face arrangement relative to the first rack 104, with the second rack 106 being located above and/or on top of the first rack 104. This spatial arrangement between the first rack 104 and the second rack 106 provides a relatively smaller, planar, and substantially continuous warming surface onto which one or more food item(s) can be placed. The first rack 104 and the second rack 106 are respectively located and/or positioned above the cooking grate(s) 918 that are commonly located within the cookbox 902. The horizontal orientation 1402 of the warming rack 100 as shown in FIGS. 14-17 is defined by the planar top surface 128 of the first rack 104 and/or the planar bottom surface 304 of the second rack 106. As shown in FIGS. 14-17, the planar top surface 128 of the first rack 104 and/or the planar bottom surface 304 of the second rack 106 is/are substantially parallel to a horizontal plane defined by the upper surface(s) of the cooking grate(s) 918.

The warming rack 100 of FIGS. 1-17 is configured such that the warming surface provided by the first rack 104 and the second rack 106 when the warming rack 100 is positioned and/or arranged in the collapsed configuration 502 and coupled to the cookbox 902 in the horizontal orientation 1402 fills, covers, and/or occupies substantially all of the width, and less than half (e.g., approximately one-third) of the depth, of the cookbox 902. For example, as shown in FIGS. 14-17, the cooking grate(s) 918 has/have an example depth 1302 within the cookbox 902. The warming rack 100 has an example depth 1702 within the cookbox 902, with the depth 1702 of the warming rack 100 being approximately one-third of the depth 1302 of the cooking grate(s) 918. Positioning and/or arranging the warming rack 100 in the collapsed configuration 502 and the horizontal orientation 1402 shown in FIGS. 14-17 reduces the form factor and/or footprint of the useable warming surface provided by the first rack 104 and the second rack 106 of the warming rack 100 relative to the form factor and/or footprint of the useable warming surface provided by the first rack 104 and the second rack 106 of the warming rack 100 when the warming rack is positioned and/or arranged in the expanded configuration 102 and the horizontal orientation 1002 of FIGS. 10-13 described above. The spatial arrangement and/or configuration of the warming rack 100 as shown in FIGS. 14-17 can be particularly advantageous in instances where a user wants to place a relatively smaller sized food item and/or a lesser number of food items on the warming rack 100, and/or in instances where the amount of available vertical clearance space residing above and/or over the cooking grate(s) 918 at a location forward of the warming rack 100 is of moderate concern to the user.

Figure 18:
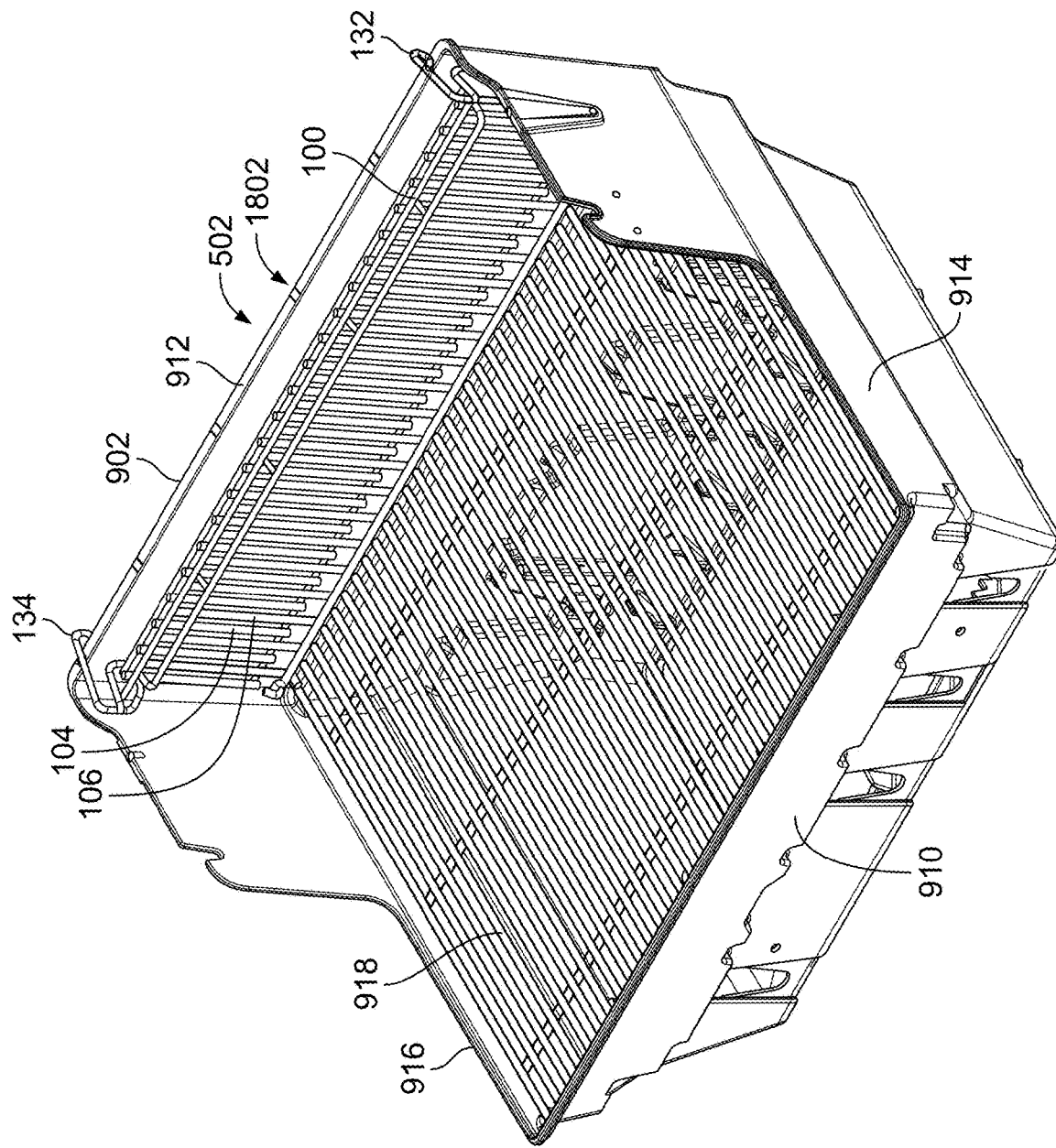
FIG. 18 is a first perspective view of the cookbox of FIG. 9, with the warming rack shown positioned in the collapsed configuration of FIGS. 5-8 and further positioned in an example non-horizontal orientation.
Figure 19:
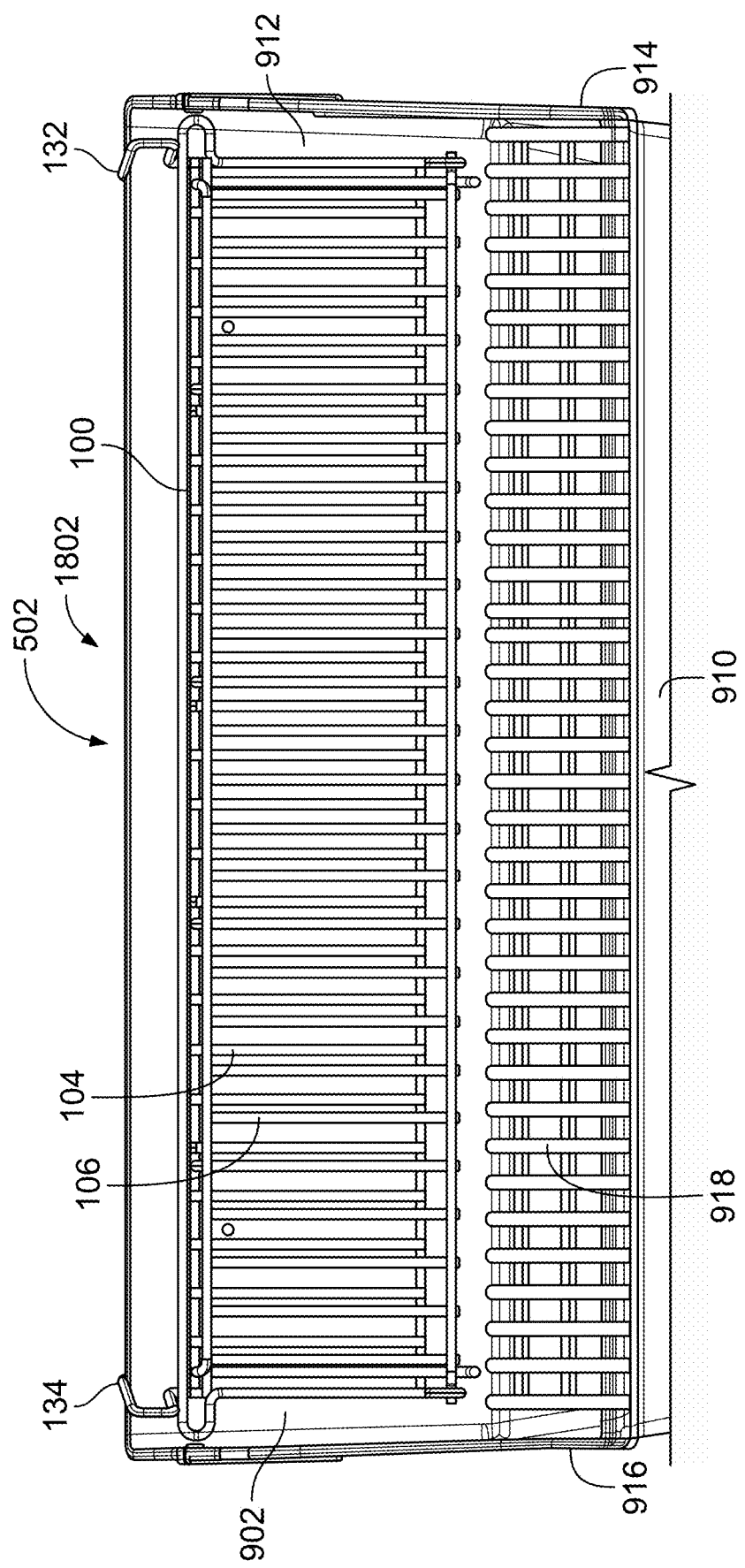
FIG. 19 is a second perspective view of the cookbox of FIGS. 9 and 18, with the warming rack shown positioned in the collapsed configuration of FIGS. 5-8 and 18 and the non-horizontal orientation of FIG. 18.
Figure 20:
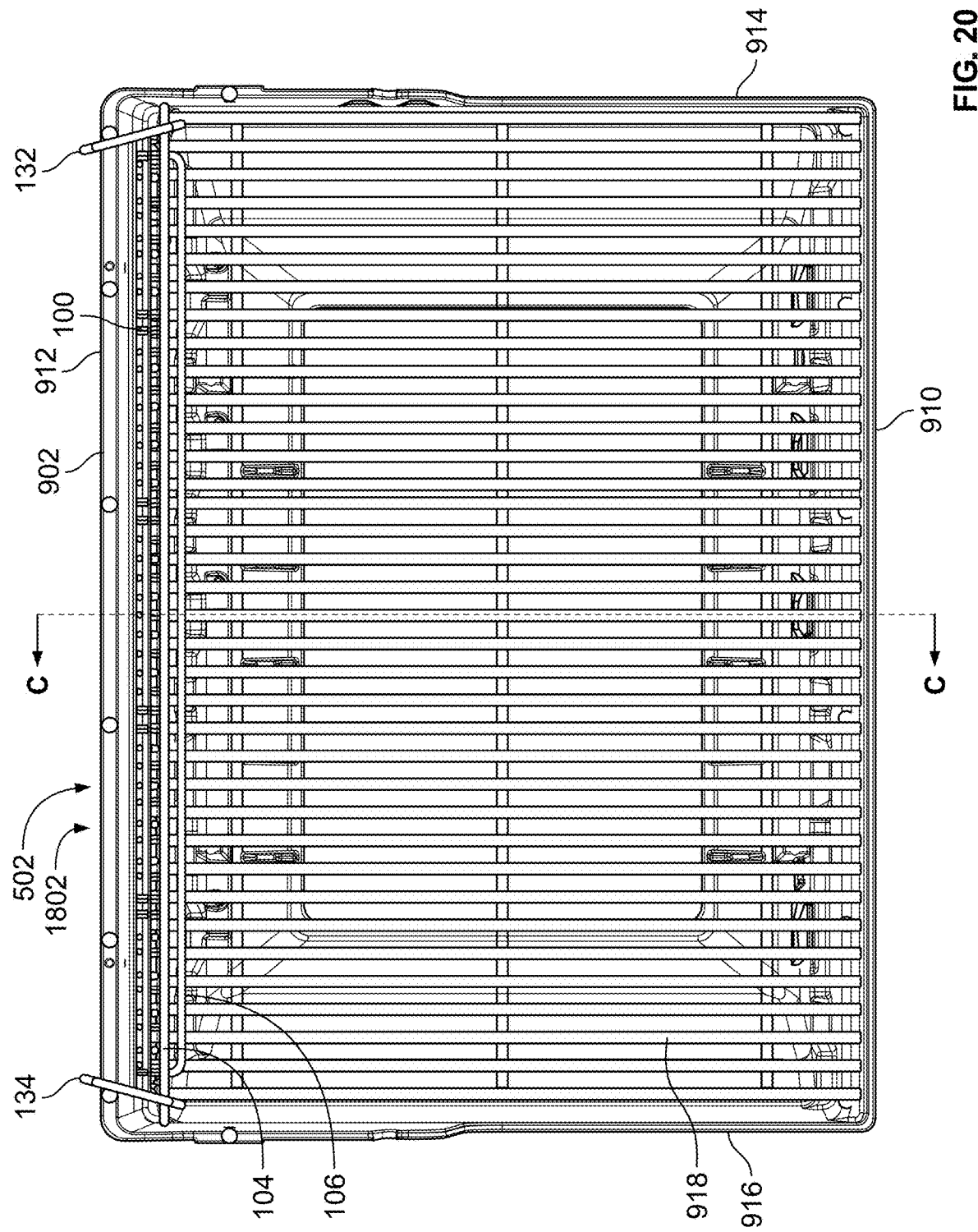
FIG. 20 is a top view of the cookbox of FIGS. 9, 18, and 19, with the warming rack shown positioned in the collapsed configuration of FIGS. 5-8, 18, and 19 and the non-horizontal orientation of FIGS. 18 and 19.
Figure 21:
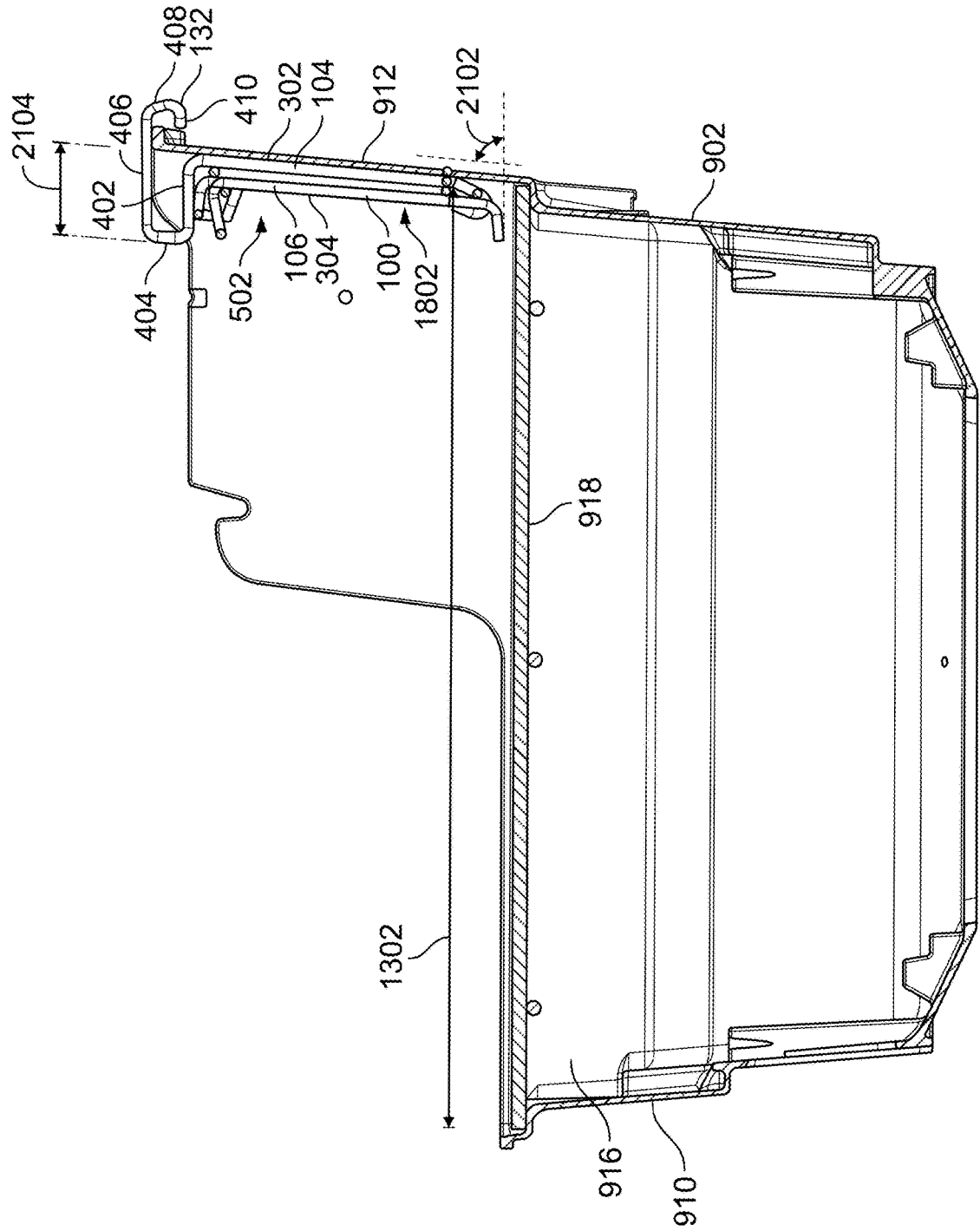
FIG. 21 is a cross-sectional view of the cookbox of FIGS. 9 and 18-20 taken along section C-C of FIG. 20, with the warming rack shown positioned in the collapsed configuration of FIGS. 5-8 and 18-20 and the non-horizontal orientation of FIGS. 18-20.

FIG. 18 is a first perspective view of the cookbox 902 of FIG. 9, with the warming rack 100 shown positioned in the collapsed configuration 502 of FIGS. 5-8 and further positioned in an example non-horizontal orientation 1802. FIG. 19 is a second perspective view of the cookbox 902 of FIGS. 9 and 18, with the warming rack 100 shown positioned in the collapsed configuration 502 of FIGS. 5-8 and 18 and the non-horizontal orientation 1802 of FIG. 18. FIG. 20 is a top view of the cookbox 902 of FIGS. 9, 18, and 19, with the warming rack 100 shown positioned in the collapsed configuration 502 of FIGS. 5-8, 18, and 19 and the non-horizontal orientation 1802 of FIGS. 18 and 19. FIG. 21 is a cross-sectional view of the cookbox 902 of FIGS. 9 and 18-20 taken along section C-C of FIG. 20, with the warming rack 100 shown positioned in the collapsed configuration 502 of FIGS. 5-8 and 18-20 and the non-horizontal orientation 1802 of FIGS. 18-20.

In the illustrated example of FIGS. 18-21, the first rack 104 and/or, more generally, the warming rack 100 is coupled to the rear wall 912 of the cookbox 902 via the first hook 132 and the second hook 134 of the first rack 104. As shown in FIG. 21, the first segment 402 and the second segment 404 of the first hook 132 are respectively located within the cookbox 902, with the bottom surface 302 of the first rack 104 contacting an interior surface of the rear wall 912 of the cookbox 902. The third segment 406 of the first hook 132 is located above the cookbox 902, with the third segment 406 contacting and extending across an upper edge of the rear wall 912 of the cookbox 902. The fourth segment 408 and the fifth segment 410 of the first hook 132 are respectively located outside of the cookbox 902, with a free end of the fifth segment 410 facing toward and/or contacting an exterior surface of the rear wall 912 of the cookbox 902. The second hook 134 of the first rack 104 is arranged relative to the rear wall 912 of the cookbox 902 in a manner that is substantially identical to the above-described arrangement of the first hook 132 of the first rack 104 relative to the rear wall 912 of the cookbox 902.

In the illustrated example of FIGS. 18-21, the second rack 106 is located and/or positioned in a face-to-face arrangement relative to the first rack 104. The first rack 104 and the second rack 106 are respectively located and/or positioned above the cooking grate(s) 918 that are commonly located within the cookbox 902. The non-horizontal orientation 1802 of the warming rack 100 as shown in FIGS. 18-21 is defined by the planar top surface 128 of the first rack 104 and/or the planar bottom surface 304 of the second rack 106. As shown in FIGS. 18-21, the planar top surface 128 of the first rack 104 and/or the planar bottom surface 304 of the second rack 106 is/are positioned at an example angle 2102 relative to a horizontal plane defined by the upper surface(s) of the cooking grate(s) 918. In the illustrated example of FIGS. 18-21, the angle 2102 is approximately eighty-five degrees (85°). In other examples, the angle 2102 can instead be as little as forty-five degrees (45°), or as great as ninety degrees (90°).

The warming rack 100 of FIGS. 1-21 is configured such that the no usable warming surface is provided by the first rack 104 and the second rack 106 when the warming rack 100 is positioned and/or arranged in the collapsed configuration 502 and coupled to the cookbox 902 in the non-horizontal orientation 1802. In this regard, when the warming rack is positioned, arranged, and or oriented as shown in FIGS. 18-21, the warming rack fills, covers, and/or occupies substantially all of the width, and less than one-quarter (e.g., approximately one-tenth) of the depth of the cookbox 902. For example, as shown in FIGS. 18-21, the cooking grate(s) 918 has/have an example depth 1302 within the cookbox 902. The warming rack 100 has an example depth 2104 within the cookbox 902, with the depth 2104 of the warming rack 100 being approximately one-tenth of the depth 1302 of the cooking grate(s) 918. Positioning and/or arranging the warming rack 100 in the collapsed configuration 502 and the non-horizontal orientation 1802 shown in FIGS. 18-21 further reduces and/or effectively eliminates the form factor and/or footprint of the useable warming surface provided by the first rack 104 and the second rack 106 of the warming rack 100 relative to the form factor and/or footprint of the useable warming surface provided by the first rack 104 and the second rack 106 of the warming rack 100 when the warming rack is positioned and/or arranged in the collapsed configuration 502 and the horizontal orientation 1402 of FIGS. 14-17 described above. The spatial arrangement and/or configuration of the warming rack 100 as shown in FIGS. 18-21 can be particularly advantageous in instances where a user does not want to place any food items on the warming rack 100, and/or in instances where the amount of available vertical clearance space residing above and/or over the cooking grate(s) 918 at a location forward of the warming rack 100 is of great concern to the user.

Figure 22:
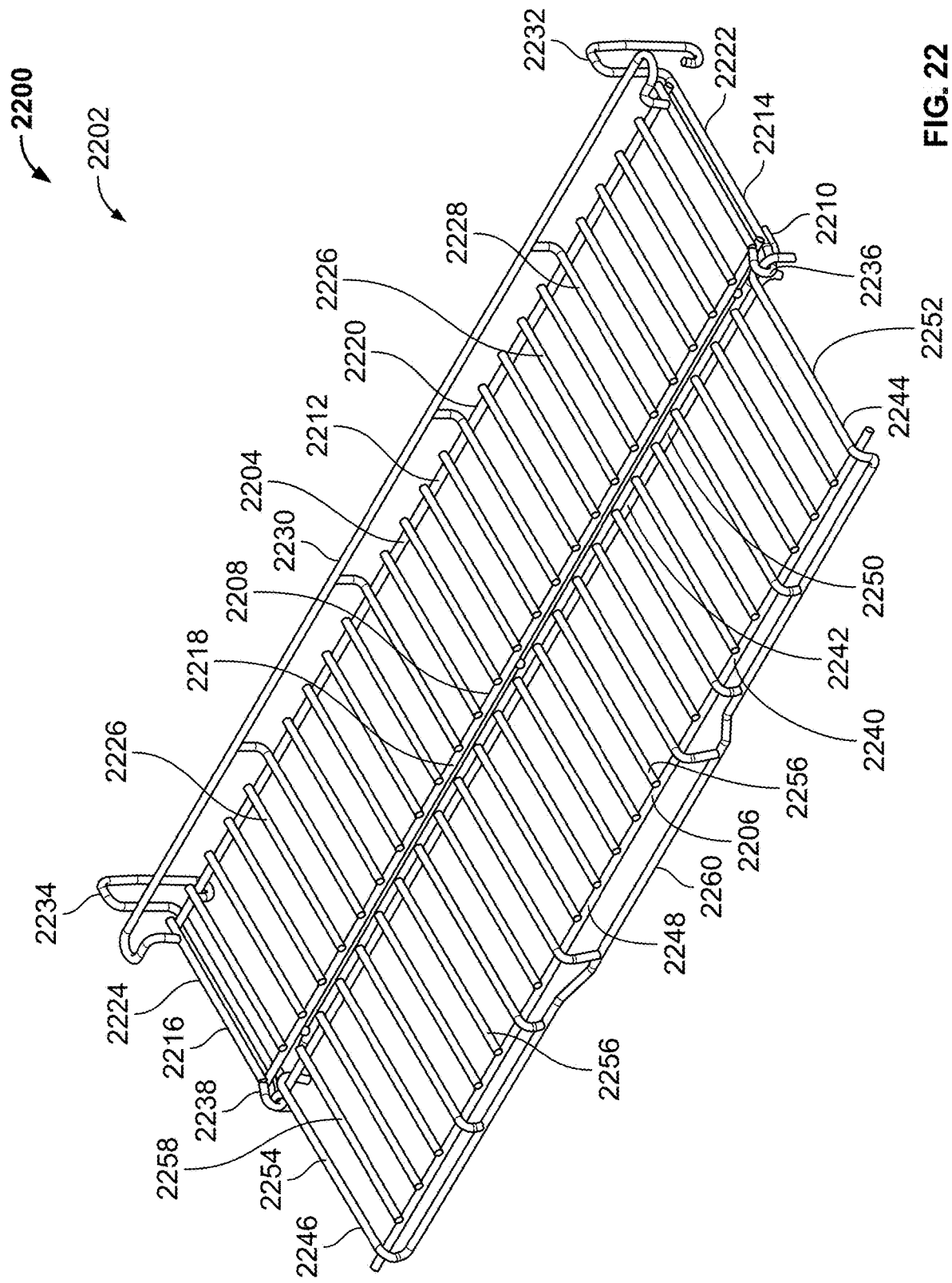
FIG. 22 is a perspective view of another example warming rack constructed in accordance with teachings of this disclosure, with the warming rack shown positioned in an example expanded configuration.
Figure 23:
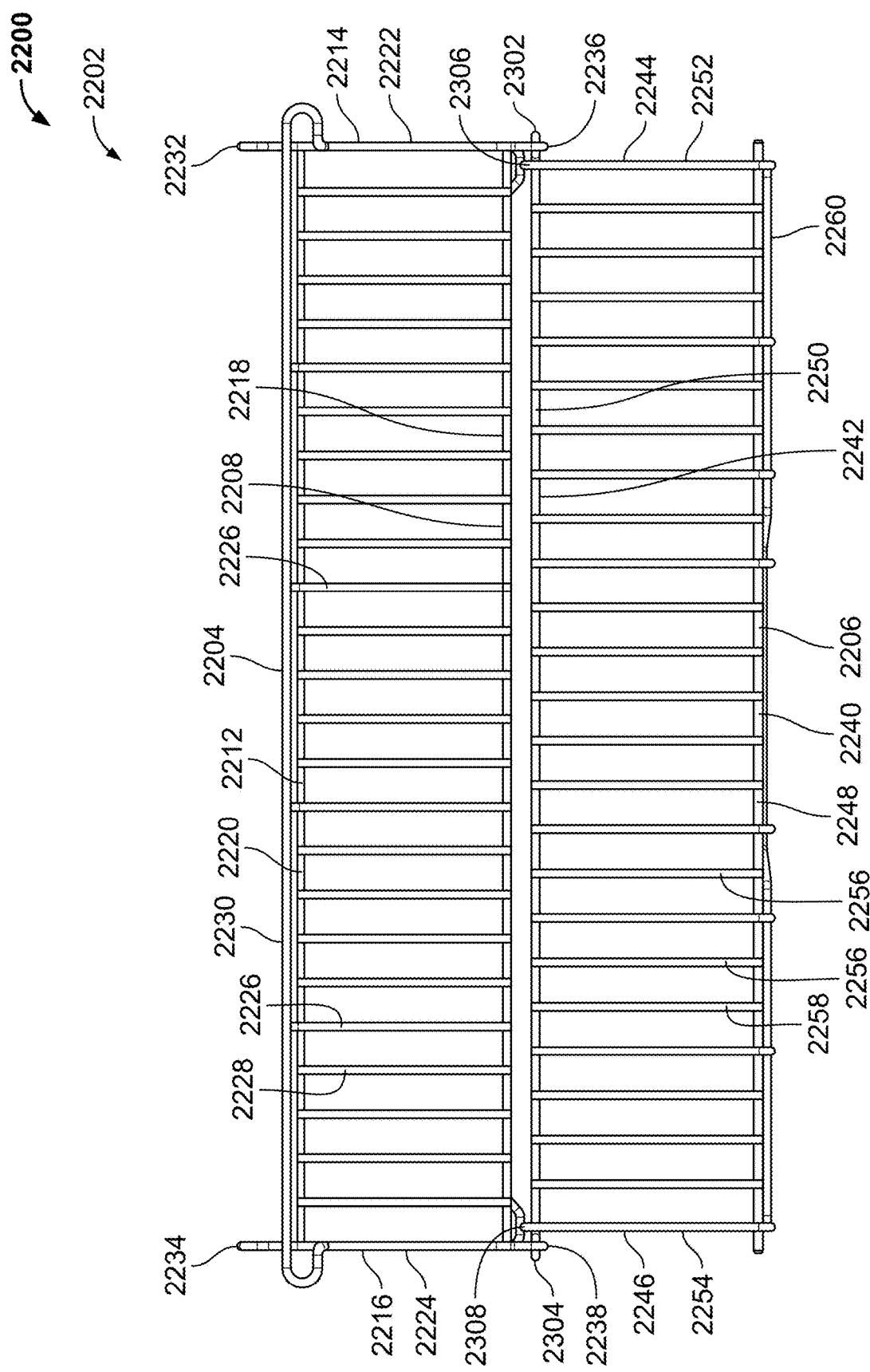
FIG. 23 is a top view of the warming rack of FIG. 22, with the warming rack shown positioned in the expanded configuration of FIG. 22.
Figure 24:
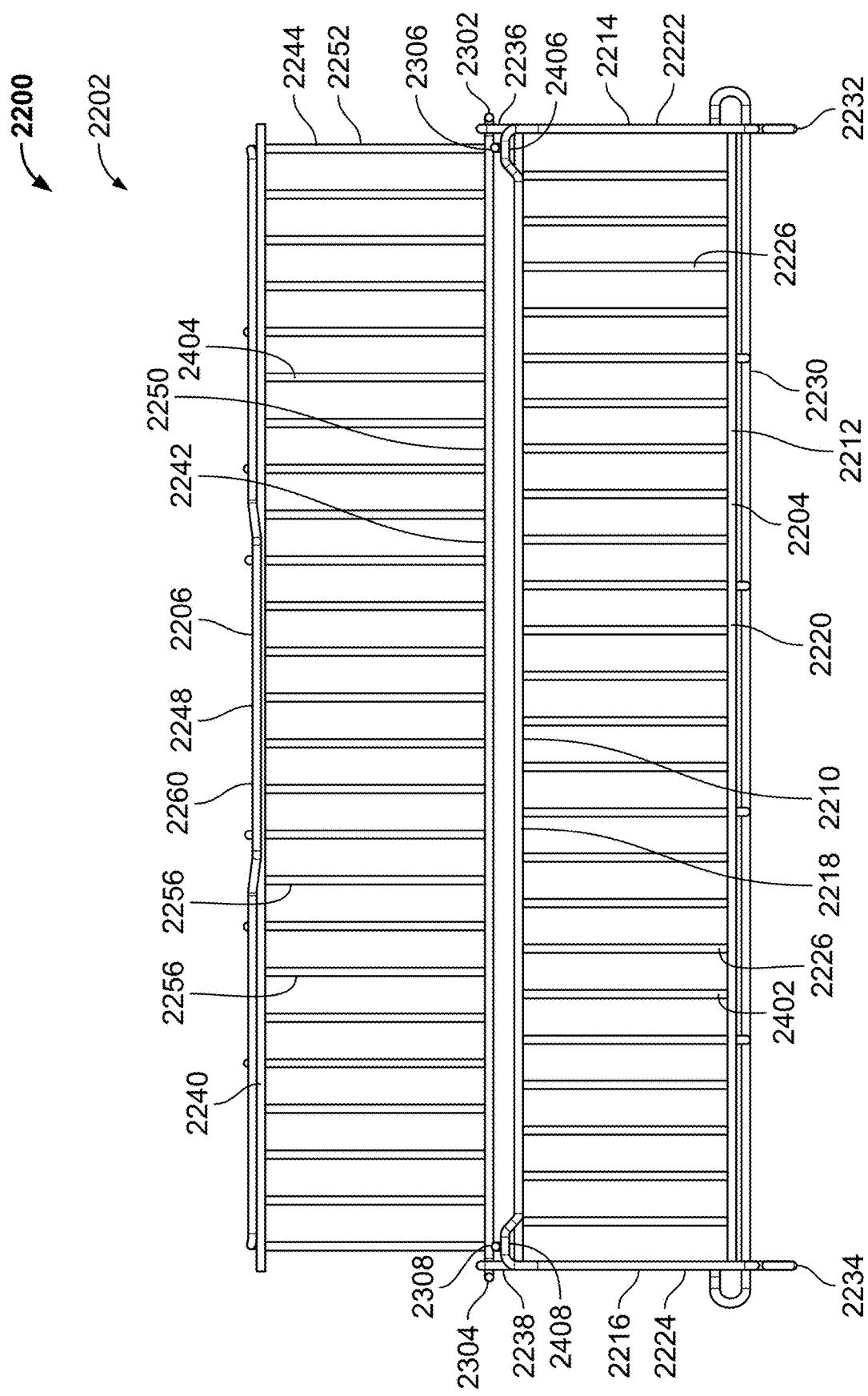
FIG. 24 is a bottom view of the warming rack of FIGS. 22 and 23, with the warming rack shown positioned in the expanded configuration of FIGS. 22 and 23.
Figure 25:
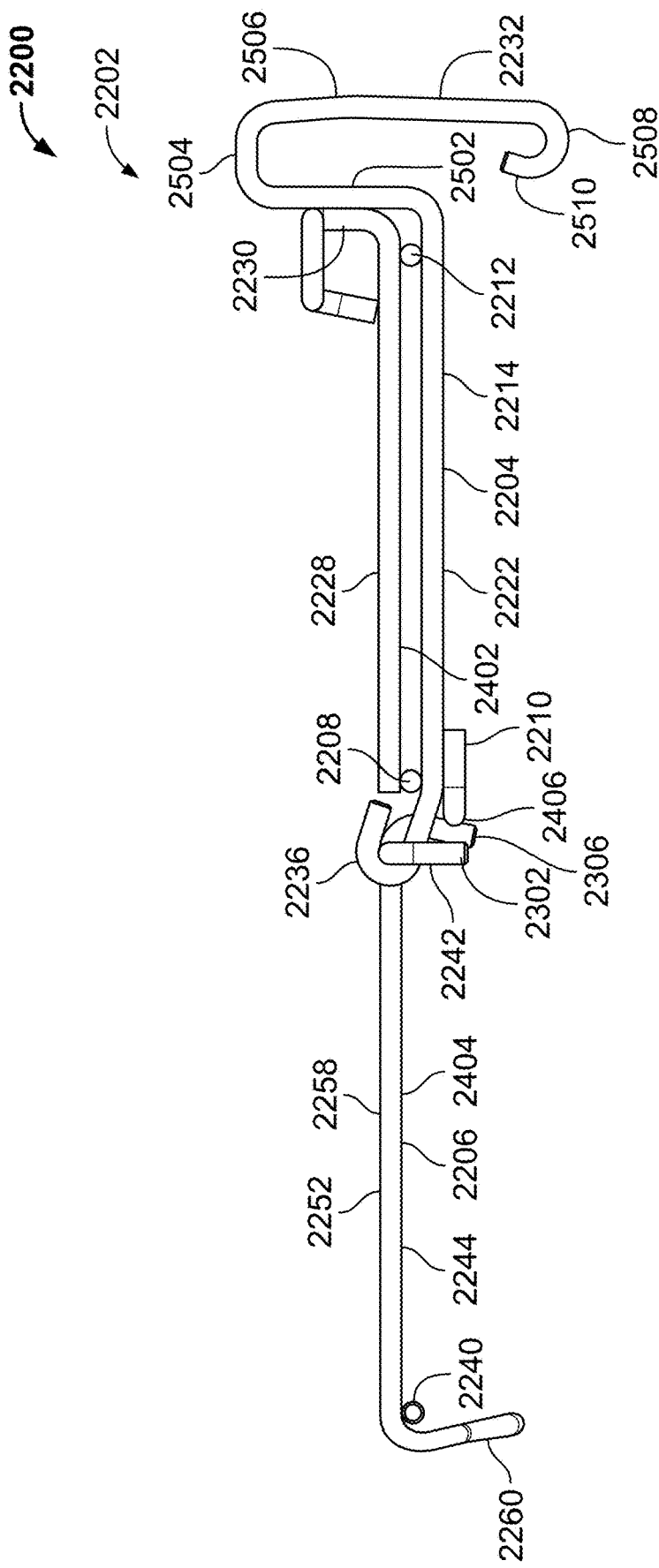
FIG. 25 is a right side view of the warming rack of FIGS. 22-24, with the warming rack shown positioned in the expanded configuration of FIGS. 22-24.
Figure 26:
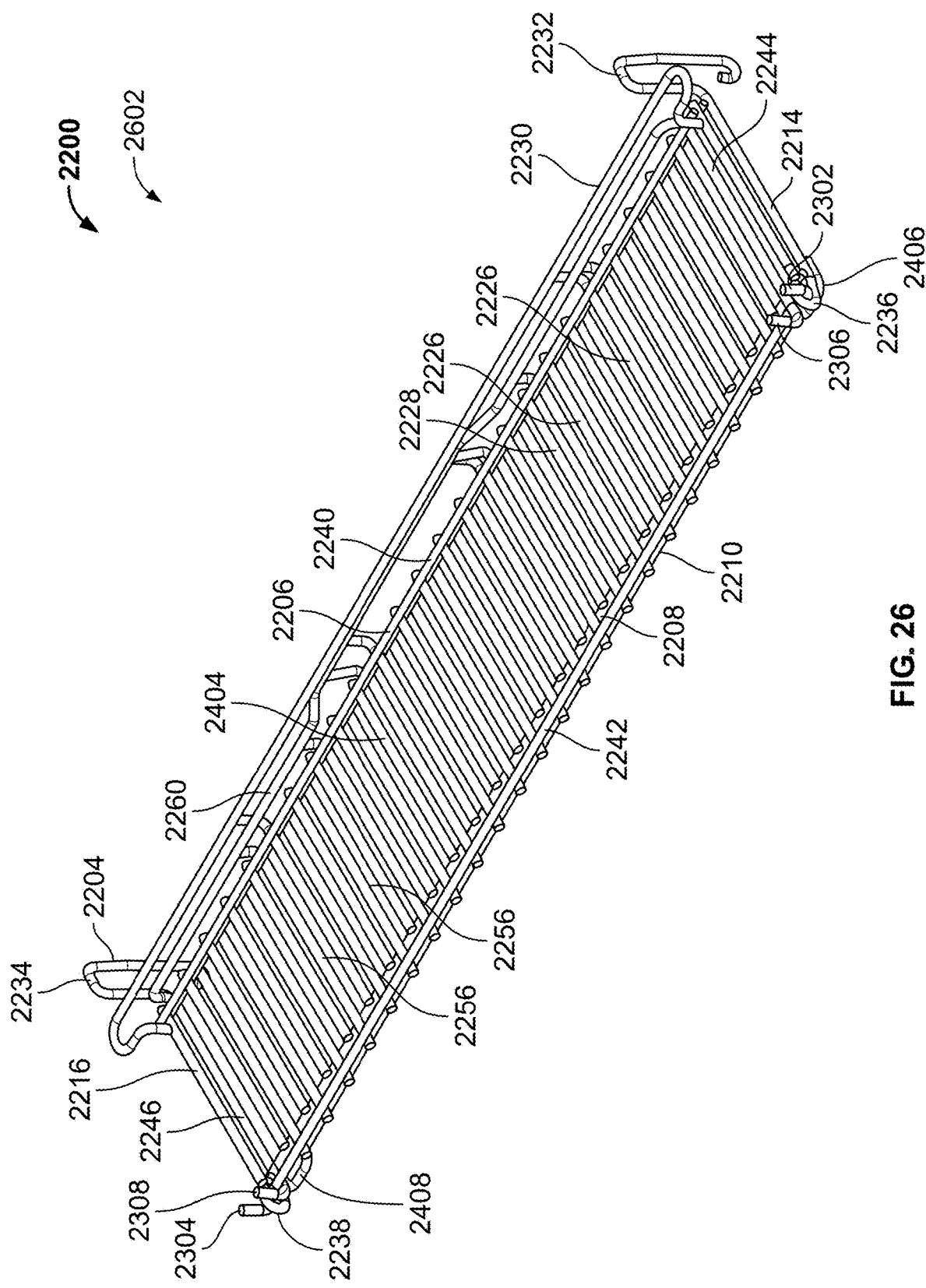
FIG. 26 is a perspective view of the warming rack of FIGS. 22-25, with the warming rack shown positioned in an example collapsed configuration.
Figure 27:
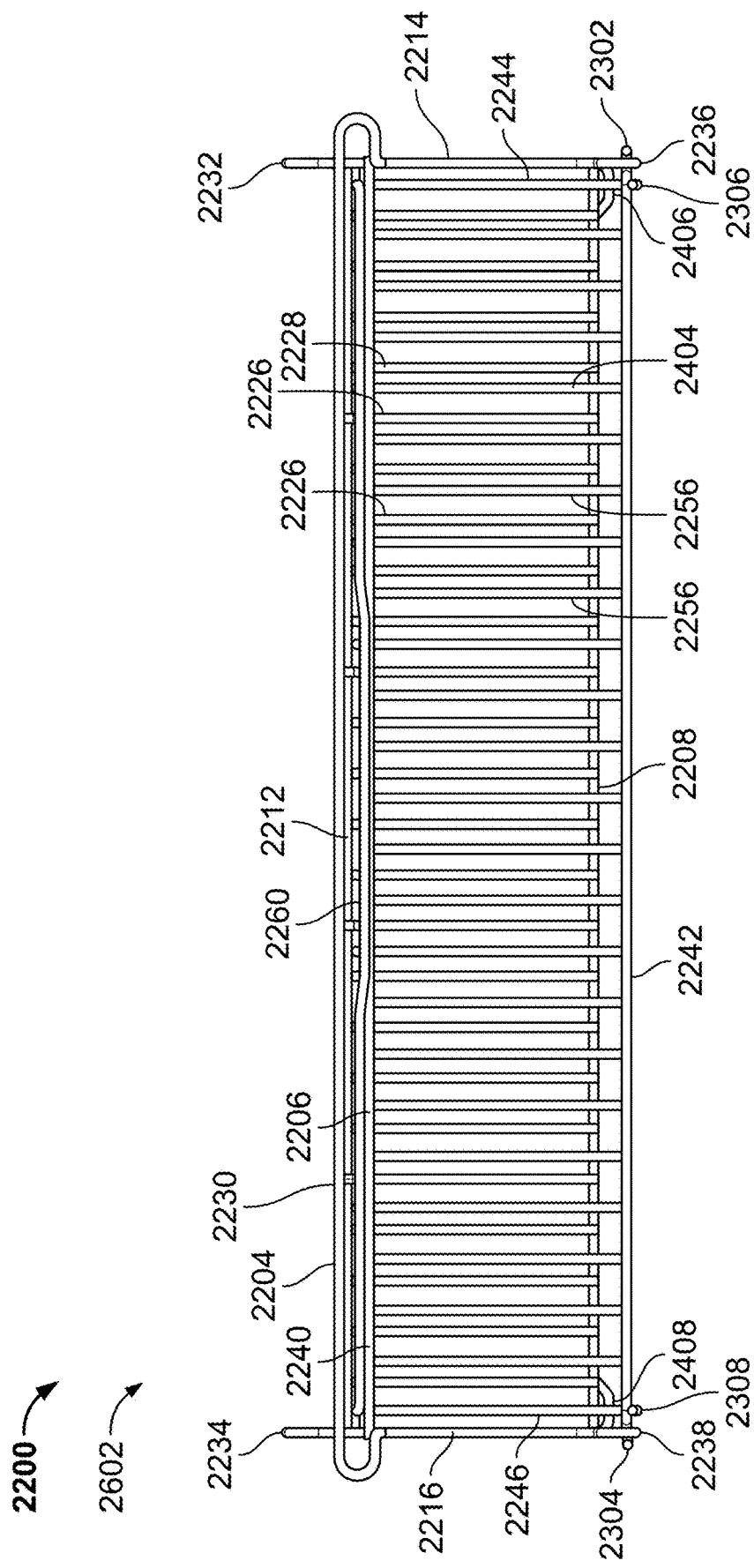
FIG. 27 is a top view of the warming rack of FIGS. 22-26, with the warming rack shown positioned in the collapsed configuration of FIG. 26.
Figure 28:
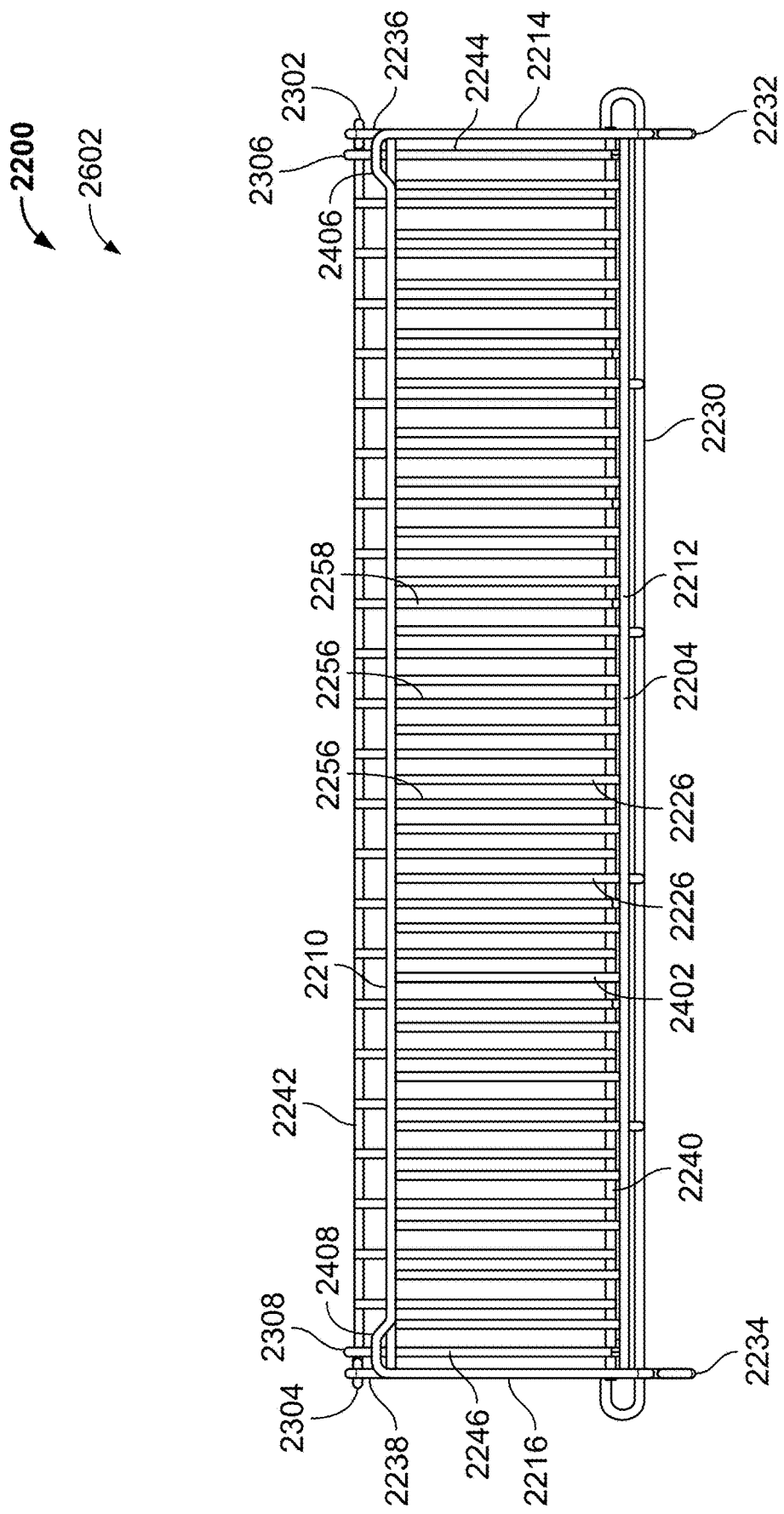
FIG. 28 is a bottom view of the warming rack of FIGS. 22-27, with the warming rack shown positioned in the collapsed configuration of FIGS. 26 and 27.
Figure 29:
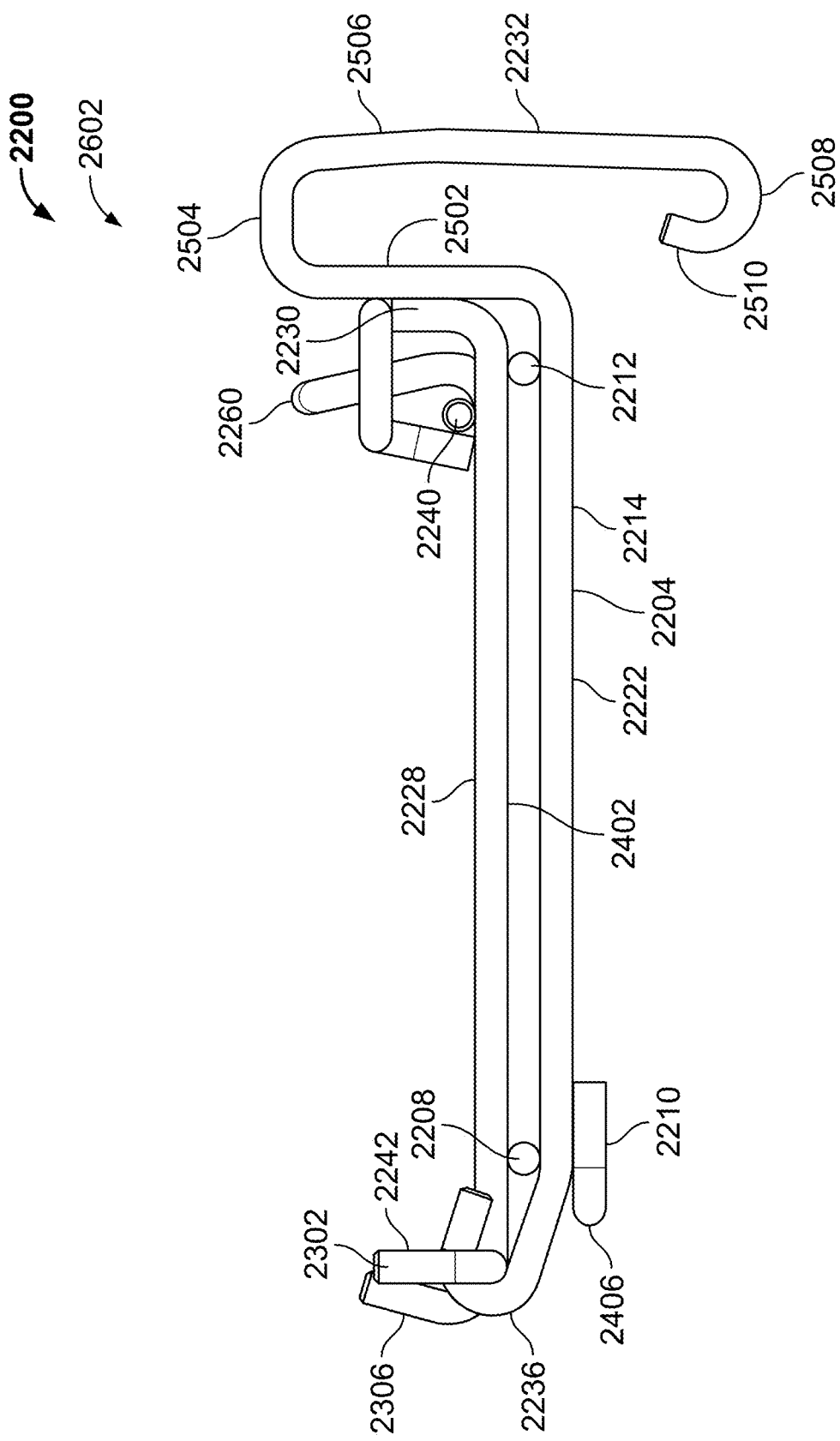
FIG. 29 is a right side view of the warming rack of FIGS. 22-28, with the warming rack shown positioned in the collapsed configuration of FIGS. 26-28.

FIG. 22 is a perspective view of another example warming rack 2200 constructed in accordance with teachings of this disclosure, with the warming rack 2200 shown positioned in an example expanded configuration 2202. FIG. 23 is a top view of the warming rack 2200 of FIG. 22, with the warming rack 2200 shown positioned in the expanded configuration 2202 of FIG. 22. FIG. 24 is a bottom view of the warming rack 2200 of FIGS. 22 and 23, with the warming rack 2200 shown positioned in the expanded configuration 2202 of FIGS. 22 and 23. FIG. 25 is a right side view of the warming rack 2200 of FIGS. 22-24, with the warming rack 2200 shown positioned in the expanded configuration 2202 of FIGS. 22-24. FIG. 26 is a perspective view of the warming rack 2200 of FIGS. 22-25, with the warming rack 2200 shown positioned in an example collapsed configuration 2602. FIG. 27 is a top view of the warming rack 2200 of FIGS. 22-26, with the warming rack 2200 shown positioned in the collapsed configuration 2602 of FIG. 26. FIG. 28 is a bottom view of the warming rack 2200 of FIGS. 22-27, with the warming rack 2200 shown positioned in the collapsed configuration 2602 of FIGS. 26 and 27. FIG. 29 is a right side view of the warming rack 2200 of FIGS. 22-28, with the warming rack 2200 shown positioned in the collapsed configuration 2602 of FIGS. 26-28.

The warming rack 2200 of FIGS. 22-29 is structured and/or configured in a manner that is substantially the same as the above-described warming rack 100 of FIG. 1-8, with the warming rack 2200 of FIGS. 22-29 being movable between the expanded configuration 2202 of FIGS. 22-25 and the collapsed configuration 2602 of FIG. 26-29 in the same manner that the warming rack 100 of FIGS. 1-8 is movable between the expanded configuration 102 of FIGS. 1-4 and the collapsed configuration 502 of FIGS. 5-8. With regard to correspondence among parts, the warming rack 2200 of FIGS. 22-29 includes an example first rack 2204 and an example second rack 2206 that are respectively structured and/or configured in a manner that is substantially the same as corresponding ones of the first rack 104 and the second rack 106 of the warming rack 100 of FIGS. 1-8.

More specifically, the first rack 2204 of the warming rack 2200 of FIGS. 22-29 includes an example first support rod 2208, an example second support rod 2210, an example third support rod 2212, an example fourth support rod 2214, an example fifth support rod 2216, an example front end 2218, an example rear end 2220, an example right side 2222, an example left side 2224, example crosswise rods 2226, an example top surface 2228, an example bottom surface 2402, an example rail 2230, an example first hook 2232 (having an example first segment 2502, an example second segment 2504, an example third segment 2506, an example fourth segment 2508, and an example firth segment 2510), an example second hook 2234, an example first retention loop 2236, and an example second retention loop 2238 that are respectively configured and/or structured in a manner that is substantially the same as corresponding ones of the first support rod 108, the second support rod 110, the third support rod 112, the fourth support rod 114, the fifth support rod 116, the front end 118, the rear end 120, the right side 122, the left side 124, the crosswise rods 126, the top surface 128, the bottom surface 302, the rail 130, the first hook 132 (having the first segment 402, the second segment 404, the third segment 406, the fourth segment 408, and the fifth segment 410), the second hook 134, the first retention loop 136, and the second retention loop 138 of the above-described first rack 104 of the warming rack 100 of FIGS. 1-8.

Similarly, the second rack 2206 of the warming rack 2200 of FIGS. 22-29 includes an example first support rod 2240, an example second support rod 2242 (having an example first end portion 2302 and an example second end portion 2304), an example third support rod 2244 (having an example first stop arm 2306), an example fourth support rod 2246 (having an example second stop arm 2308), an example front end 2248, an example rear end 2250, an example right side 2252, an example left side 2254, example crosswise rods 2256, an example top surface 2258, an example bottom surface 2404, and an example rail 2260 that are respectively structured and/or configured in a manner that is substantially the same as corresponding ones of the first support rod 140, the second support rod 142 (having the first end portion 202 and the second end portion 204), the third support rod 144 (having the first stop arm 206), the fourth support rod 146 (having the second stop arm 208), the front end 148, the rear end 150, the right side 152, the left side 154, the crosswise rods 156, the top surface 158, the bottom surface 304, and the rail 160 of the above-described second rack 106 of the warming rack 100 of FIGS. 1-8.

The structural differences between the warming rack 2200 of FIGS. 22-29 and the warming rack 100 of FIGS. 1-8 are relatively minimal. As one example, the first hook 132 is canted relative to the fourth support rod 114 of the first rack 104 of FIGS. 1-8, and the second hook 134 is canted relative to the fifth support rod 116 of the first rack 104 of FIGS. 1-8. By comparison, the first hook 2232 has a parallel orientation relative to the fourth support rod 2214 of the first rack 2204 of FIGS. 22-29, and the second hook 2234 has a parallel orientation relative to the fifth support rod 2216 of the first rack 2204 of FIGS. 22-29.

As another example, the second support rod 110 of the first rack 104 of FIGS. 1-8 has a linear shape extending from the right side 122 to the left side 124 of the first rack 104. By comparison, the second support rod 2210 of the first rack 2204 of FIGS. 22-29 includes an example first projection 2406 (e.g., a first forwardly-extending projection) located proximate the right side 2222 of the first rack 2204 and an example second projection 2408 (e.g., a second forwardly-extending projection) located proximate the left side 2224 of the first rack 2204. As shown in FIGS. 22-25, the first projection 2406 of the second support rod 2210 of the first rack 2204 provides an engagement surface for the first stop arm 2306 of the second rack 2206, and the second projection 2408 of the second support rod 2210 of the first rack 2204 provides an engagement surface for the second stop arm 2308 of the second rack 2206. In this regard, the first stop arm 2306 and the second stop arm 2308 of the second rack 2206 are respectively configured to contact corresponding ones of the first projection 2406 and the second projection 2408 of the second support rod 2210 of the first rack 2204 when the warming rack 2200 is positioned in the expanded configuration 2202 shown in FIGS. 22-25, thereby restricting, blocking, and/or preventing the second rack 2206 from further downward rotation relative to the first rack 2204.

As another example, the first end portion 202 and the second end portion 204 of the second support rod 142 of the second rack 106 of FIGS. 1-8 respectively terminate subsequent to extending outwardly through corresponding ones of the first retention loop 136 and the second retention loop 138 of the first rack 104 of FIGS. 1-8. By comparison, the first end portion 2302 and the second end portion 2304 of the second support rod 2242 of the second rack 2206 of FIGS. 22-29 respectively extend downward subsequent to extending outwardly through corresponding ones of the first retention loop 2236 and the second retention loop 2238 of the first rack 2204 of FIGS. 22-29. In some examples, the downward extension of the first end portion 2302 and the second end portion 2304 of the second support rod 2242 of the second rack 2206 of FIGS. 22-29 improves the mechanism by which the second rack 2206 is pivotally coupled to the first rack 2204, and/or improves the mechanism by which the second support rod 2242 of the second rack 2206 is retained by the first retention loop 2236 and the second retention loop 2238 of the first rack 2204.

As another example, the rail 160 of the second rack 106 of FIGS. 1-8 has a linear shape extending from the right side 152 to the left side 154 of the second rack 106. By comparison, the rail 2260 of the second rack 2206 of FIGS. 22-29 has a contoured shape extending from the right side 2252 to the left side 2254 of the second rack 2206, with the contoured shape including a relatively taller, centrally-located (e.g., middle) segment bounded by two relatively shorter segments. In some examples, the contoured shape of the rail 2260 of the second rack 2206 shown in FIGS. 22-29 improves the case by which a user may grip and/or grasp (e.g., by the user's hand and/or fingers, or by means of a cooking utensil held by the user) the rail 2260 of the second rack 2206 in connection with transitioning the warming rack 2200 between the expanded configuration 2202 of FIGS. 22-25 and the collapsed configuration 2602 of FIGS. 26-29.

Aside from the above-identified differences, the warming rack 2200 of FIGS. 22-29 is structured and/or configured in a manner that is substantially the same as the above-described warming rack 100 of FIG. 1-8, with the warming rack 2200 of FIGS. 22-29 being movable between the expanded configuration 2202 of FIGS. 22-25 and the collapsed configuration 2602 of FIG. 26-29 in the same manner that the warming rack 100 of FIGS. 1-8 is movable between the expanded configuration 102 of FIGS. 1-4 and the collapsed configuration 502 of FIGS. 5-8. As shown in FIGS. 22-25, the second rack 2206 is located and/or positioned in a side-by-side arrangement relative to the first rack 2204 when the warming rack 2200 is in the expanded configuration 2202. This spatial arrangement advantageously enables the first rack 2204 and the second rack 2206 to collectively provide a relatively large, planar, and substantially continuous warming surface onto which one or more food item(s) can be placed. In some examples, the warming rack 2200 is configured such that the warming surface provided by the first rack 2204 and the second rack 2206 when the warming rack 2200 is in the expanded configuration 2202 fills, covers, and/or occupies substantially all of the width, and approximately half of the depth, of a cookbox to which the warming rack 2200 is coupled. In this regard, positioning and/or arranging the warming rack 2200 in the expanded configuration 2202 maximizes the form factor and/or footprint of the useable warming surface provided by the first rack 2204 and the second rack 2206 of the warming rack 2200.

The warming rack 2200 of FIGS. 22-29 can be transitioned (e.g., by a user's hand and/or fingers, or by means of a cooking utensil held by the user) from the expanded configuration 2202 shown in FIGS. 22-25 into the collapsed configuration 2602 shown in FIGS. 26-29 by pivoting and/or rotating the second rack 2206 of the warming rack 2200 relative to the first rack 2204 of the warming rack 2200 such that the top surface 2258 of the second rack 2206 is placed into a face-to-face arrangement with the top surface 2228 of the first rack 2204. This spatial arrangement results in the first rack 2204 and the second rack 2206 collectively providing a planar warming surface onto which one or more food item(s) can be placed, with the provided warming surface associated with the collapsed configuration 2602 of the warming rack 2200 (e.g., as shown in FIGS. 26-29) being relatively smaller than the corresponding warming surface associated with the expanded configuration 2202 of the warming rack 2200 (e.g., as shown in FIGS. 22-25). In some examples, the warming rack 2200 is configured such that the warming surface provided by the first rack 2204 and the second rack 2206 when the warming rack 2200 is in the collapsed configuration 2602 of FIGS. 26-29 fills, covers, and/or occupies substantially all of the width, and less than half (e.g., approximately one-third) of the depth, of a cookbox to which the warming rack 2200 is coupled. In this regard, positioning and/or arranging the warming rack 2200 in the collapsed configuration 2602 shown in FIGS. 26-29 reduces the form factor and/or footprint of the useable warming surface provided by the first rack 2204 and the second rack 2206 of the warming rack 2200 in comparison to the useable warming surface provided by the first rack 2204 and the second rack 2206 of the warming rack 2200 when positioned and/or arranged in the expanded configuration 2202 shown in FIGS. 22-25.

The ability of the warming rack 2200 of FIGS. 22-29 to be transitioned back and forth between the expanded configuration 2202 shown in FIGS. 22-25 and the collapsed configuration 2602 shown in FIGS. 26-29 provides advantageous tradeoff possibilities with regard to use of the warming rack 2200 in conjunction with a cookbox of a grill to which the warming rack 2200 may be coupled. For example, a user may find the form factor and/or footprint of the warming rack 2200 when positioned and/or arranged (e.g., within the cookbox of the grill) in the collapsed configuration 2602 of FIGS. 26-29 to be too small to adequately support one or more food item(s) that the user would like to place on the warming rack 2200. In such instances, the user can transition the warming rack 2200 from the collapsed configuration 2602 shown in FIGS. 26-29 into the expanded configuration 2202 shown in FIGS. 22-25, thereby increasing (e.g., maximizing) the form factor and/or footprint of the usable warming surface of the warming rack 2200. As another example, a user may find the form factor and/or footprint of the warming rack 2200 when positioned and/or arranged (e.g., within the cookbox of the grill) in the expanded configuration 2202 of FIGS. 22-25 to be obstructive and/or too large with regard to one or more food item(s) that the user would like to place on a cooking gate (e.g., positioned within the cookbox of the grill) that may be located below the warming rack 2200. In such instances, the user can transition the warming rack 2200 from the expanded configuration 2202 shown in FIGS. 22-25 into the collapsed configuration 2602 shown in FIGS. 26-29, thereby reducing the form factor and/or footprint of the usable warming surface of the warming rack 2200 while at the same time increasing the available clearance space residing above and/or over the cooking grate The warming rack 2200 of FIGS. 22-29 is structured and/or configured to be supported by and/or coupled to the cookbox 902 of the grill 900 of FIGS. 9-21 in the same manner that the warming rack 100 of FIGS. 1-8 is supported by and/or coupled to the cookbox 902 of the grill 900, as shown in FIGS. 9-21 and described above. Thus, the warming rack 2200 of FIGS. 22-29 is structured and/or configured to: (1) have the above-described horizontal orientation 1002 shown in FIGS. 10-13 when the warming rack 2200 is coupled to the cookbox 902 of the grill 900 and positioned in the expanded configuration 2202 of FIGS. 22-25; and (2) to selectively have either the above-described horizontal orientation 1402 shown in FIGS. 14-17 or the above-described non-horizontal orientation 1802 of FIGS. 18-21 when the warming rack 2200 is coupled to the cookbox 902 of the grill 900 in the collapsed configuration 2602 of FIGS. 26-29.

From the foregoing, it will be appreciated that example adjustable warming racks disclosed herein are advantageously configured to be positionable and/or arrangeable in numerous configurations within a cookbox of a grill, with the adjustable warming racks being transitionable from one configuration to another. Example adjustable warming racks disclosed herein accordingly provide enhanced flexibility with regard to the range of cooking operations that can be accommodated and/or performed within a cookbox of a grill.

In some examples, a warming rack is disclosed. In some disclosed examples, the warming rack is configured to be coupled to a cookbox of a grill. In some disclosed examples, the warming rack comprises a first rack and a second rack. In some disclosed examples, the first rack has a hook configured to couple the warming rack to the cookbox. In some disclosed examples, the second rack is pivotally coupled to the first rack. In some disclosed examples, the second rack is movable relative to the first rack to transition the warming rack between an expanded configuration and a collapsed configuration.

In some disclosed examples, the hook is configured to couple the warming rack to a rear wall of the cookbox.

In some disclosed examples, the second rack is positioned forward of the first rack within the cookbox when the warming rack is in the expanded configuration and positioned in a horizontal orientation.

In some disclosed examples, the second rack is positioned over the first rack within the cookbox when the warming rack is in the collapsed configuration and positioned in a horizontal orientation.

In some disclosed examples, the warming rack is movable from the horizontal orientation into a non-horizontal orientation when the warming rack is in the collapsed configuration.

In some disclosed examples, the non-horizontal orientation lies at an angle between forty-five and ninety degrees downward relative to the horizontal orientation.

In some disclosed examples, the hook is configured to enable movement of the warming rack from the horizontal orientation into the non-horizontal orientation when the warming rack is in the collapsed configuration.

In some disclosed examples, a bottom surface of the first rack contacts an interior surface of a rear wall of the cookbox when the warming rack is in the collapsed configuration and positioned in the non-horizontal orientation.

In some disclosed examples, the first rack includes a first retention loop located along a right side of the first rack and a second retention loop located along a left side of the first rack.

In some disclosed examples, the second rack includes a support rod having a first end portion extending through the first retention loop and a second end portion extending through the second retention loop.

In some disclosed examples, the first rack includes a rail located along a rear end of the first rack. In some disclosed examples, the rail is configured to prevent a food item from sliding off of the rear end of the first rack when the warming rack is in the expanded configuration and positioned in a horizontal orientation.

In some disclosed examples, the second rack includes a rail located along a front end of the second rack. In some disclosed examples, the rail is configured to provide a handle for transitioning the warming rack between the expanded configuration and the collapsed configuration when the warming rack is positioned.

In some disclosed examples, the first rack includes a support rod extending between a right side and a left side of the first rack. In some disclosed examples, the second rack includes a stop arm configured to engage the support rod when the warming rack is in the expanded configuration.

In some disclosed examples, engagement of the support rod with the stop arm prevents the second rack from moving downwardly relative to the first rack beyond a plane defined by the first rack.

In some examples, a warming rack is disclosed. In some disclosed examples, the warming rack is configured to be coupled to a cookbox of a grill. In some disclosed examples, the warming rack comprises a first rack and a second rack. In some disclosed examples, the first rack has a hook configured to couple the warming rack to a rear wall of the cookbox. In some disclosed examples, the second rack is pivotally coupled to the first rack. In some disclosed examples, the second rack is movable relative to the first rack to transition the warming rack between an expanded configuration and a collapsed configuration. In some disclosed examples, the second rack is to be positioned forward of the first rack within the cookbox when the warming rack is in the expanded configuration and positioned in a first horizontal orientation.

In some disclosed examples, the second rack is positioned over the first rack within the cookbox when the warming rack is in the collapsed configuration and positioned in a second horizontal orientation.

In some disclosed examples, the warming rack is movable from the second horizontal orientation into a non-horizontal orientation when the warming rack is in the collapsed configuration.

In some disclosed examples, the non-horizontal orientation lies at an angle between forty-five and ninety degrees downward relative to the second horizontal orientation.

In some disclosed examples, the hook is configured to enable movement of the warming rack from the second horizontal orientation into the non-horizontal orientation when the warming rack is in the collapsed configuration.

In some disclosed examples, a bottom surface of the first rack contacts an interior surface of a rear wall of the cookbox when the warming rack is in the collapsed configuration and positioned in the non-horizontal orientation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A warming rack configured to be coupled to a cookbox of a grill, the warming rack comprising:
   a first rack configured to be coupled to the cookbox, the first rack including a front support rod, a rear support rod, a right support rod, a left support rod, and a plurality of crosswise rods, the rear support rod spaced apart from the front support rod, the right support rod extending between the front support rod and the rear support rod, the right support rod forming a first retention loop, the left support rod spaced apart from the right support rod and extending between the front support rod and the rear support rod, the left support rod forming a second retention loop, respective ones of the crosswise rods of the first rack extending between the front support rod and the rear support rod; and
   a second rack coupled to the first rack, the second rack including a first support rod, a second support rod, and a plurality of crosswise rods, the second support rod spaced apart from the first support rod, the second support rod including a first end portion extending through and retained by the first retention loop and a second end portion extending through and retained by the second retention loop, respective ones of the crosswise rods of the second rack extending between the first support rod and the second support rod, the second rack movable relative to the first rack to transition the warming rack between an expanded configuration and a collapsed configuration, the second rack positioned forward of the first rack when the warming rack is in the expanded configuration and positioned in a horizontal orientation, the second rack positioned over the first rack when the warming rack is in the collapsed configuration and positioned in the horizontal orientation.

2. The warming rack of claim 1, wherein the front support rod of the first rack extends between the right support rod and the left support rod of the first rack, and wherein the second rack includes a stop arm configured to engage the front support rod when the warming rack is in the expanded configuration.

3. The warming rack of claim 2, wherein the stop arm is located below the crosswise rods of the second rack when the warming rack is in the expanded configuration and positioned in the horizontal orientation, wherein engagement of the stop arm with the front support rod prevents the second rack from moving downward relative to the first rack when the warming rack is in the expanded configuration and positioned in the horizontal orientation.

4. The warming rack of claim 1, wherein the first rack includes a hook located rearward of the rear support rod, the hook configured to couple the warming rack to a rear wall of the cookbox.

5. The warming rack of claim 1, wherein the crosswise rods of the second rack are interleaved relative to the crosswise rods of the first rack when the warming rack is in the collapsed configuration and positioned in the horizontal orientation.

6. The warming rack of claim 1, wherein the crosswise rods of the first rack and the crosswise rods of the second rack collectively provide a first planar warming surface when the warming rack is in the expanded configuration and positioned in the horizontal orientation, wherein the crosswise rods of the second rack provide a second planar warming surface when the warming rack is in the collapsed configuration and positioned in the horizontal orientation, and wherein a depth of the second planar warming surface is less than a depth of the first planar warming surface.

7. A warming rack configured to be coupled to a cookbox of a grill, the warming rack comprising:
   a first rack configured to be coupled to the cookbox, the first rack including a front support rod, a rear support rod, a right support rod, a left support rod, and a plurality of crosswise rods, the rear support rod spaced apart from the front support rod, the right support rod extending between the front support rod and the rear support rod, the left support rod spaced apart from the right support rod and extending between the front support rod and the rear support rod, respective ones of the crosswise rods of the first rack extending between the front support rod and the rear support rod; and a second rack coupled to the first rack, the second rack including a first support rod, a second support rod, and a plurality of crosswise rods, the second support rod spaced apart from the first support rod, respective ones of the crosswise rods of the second rack extending between the first support rod and the second support rod, the second rack movable relative to the first rack to transition the warming rack between an expanded configuration and a collapsed configuration, the second rack positioned forward of the first rack when the warming rack is in the expanded configuration and positioned in a horizontal orientation, the second rack positioned over the first rack when the warming rack is in the collapsed configuration and positioned in the horizontal orientation, the second rack further including a stop arm configured to engage the front support rod of the first rack when the warming rack is in the expanded configuration.

8. The warming rack of claim 7, wherein the stop arm is located below the crosswise rods of the second rack when the warming rack is in the expanded configuration and positioned in the horizontal orientation, wherein engagement of the stop arm with the front support rod prevents the second rack from moving downward relative to the first rack when the warming rack is in the expanded configuration and positioned in the horizontal orientation.

9. The warming rack of claim 7, wherein the first rack includes a hook located rearward of the rear support rod, the hook configured to couple the warming rack to a rear wall of the cookbox.

10. The warming rack of claim 7, wherein the crosswise rods of the second rack are interleaved relative to the crosswise rods of the first rack when the warming rack is in the collapsed configuration and positioned in the horizontal orientation.

11. The warming rack of claim 7, wherein the crosswise rods of the first rack and the crosswise rods of the second rack collectively provide a first planar warming surface when the warming rack is in the expanded configuration and positioned in the horizontal orientation, wherein the crosswise rods of the second rack provide a second planar warming surface when the warming rack is in the collapsed configuration and positioned in the horizontal orientation, and wherein a depth of the second planar warming surface is less than a depth of the first planar warming surface.

12. A warming rack configured to be coupled to a cookbox of a grill, the warming rack comprising:

a first rack configured to be coupled to the cookbox, the first rack including a first retention loop located along a right side of the first rack and a second retention loop located along a left side of the first rack; and a second rack pivotally coupled to the first rack, the second rack including a support rod having a first end portion extending through the first retention loop and a second end portion extending through the second retention loop, the second rack movable relative to the first rack to transition the warming rack between an expanded configuration and a collapsed configuration.

13. The warming rack of claim 12, wherein the second rack is positioned forward of the first rack when the warming rack is in the expanded configuration and positioned in a horizontal orientation, and wherein the second rack is positioned over the first rack when the warming rack is in the collapsed configuration and positioned in the horizontal orientation.

14. The warming rack of claim 12, wherein the first rack includes a hook configured to couple the warming rack to a rear wall of the cookbox.

15. The warming rack of claim 12, wherein the first rack includes a rail located along a rear end of the first rack, the rail configured to prevent a food item from sliding off of the rear end of the first rack when the warming rack is in the expanded configuration and positioned in a horizontal orientation.

16. A warming rack configured to be coupled to a cookbox of a grill, the warming rack comprising:

a first rack configured to be coupled to the cookbox, the first rack including a support rod extending between a right side and a left side of the first rack; and a second rack pivotally coupled to the first rack, the second rack movable relative to the first rack to transition the warming rack between an expanded configuration and a collapsed configuration, the second rack including a stop arm configured to engage the support rod when the warming rack is in the expanded configuration.

17. The warming rack of claim 16, wherein engagement of the stop arm with the support rod prevents the second rack from moving downward relative to the first rack when the warming rack is in the expanded configuration and positioned in a horizontal orientation.

18. The warming rack of claim 16, wherein the second rack is positioned forward of the first rack when the warming rack is in the expanded configuration and positioned in a horizontal orientation, and wherein the second rack is positioned over the first rack when the warming rack is in the collapsed configuration and positioned in the horizontal orientation.

19. The warming rack of claim 16, wherein the first rack includes a hook configured to couple the warming rack to a rear wall of the cookbox.

20. The warming rack of claim 16, wherein the first rack includes a rail located along a rear end of the first rack, the rail configured to prevent a food item from sliding off of the rear end of the first rack when the warming rack is in the expanded configuration and positioned in a horizontal orientation.

21. A warming rack configured to be coupled to a cookbox of a grill, the warming rack comprising:

a first rack configured to be coupled to the cookbox, the first rack including a first front support rod, a second front support rod, a rear support rod, a right support rod, a left support rod, and a plurality of crosswise rods, the rear support rod spaced apart from the first front support rod, the right support rod extending between the first front support rod and the rear support rod, the left support rod spaced apart from the right support rod and extending between the first front support rod and the rear support rod, respective ones of the crosswise rods of the first rack extending between the first front support rod and the rear support rod; and a second rack coupled to the first rack, the second rack including a first support rod, a second support rod, and a plurality of crosswise rods, the second support rod spaced apart from the first support rod, respective ones of the crosswise rods of the second rack extending between the first support rod and the second support rod, the second rack movable relative to the first rack to transition the warming rack between an expanded configuration and a collapsed configuration, the second rack positioned forward of the first rack when the warming rack is in the expanded configuration and positioned in a horizontal orientation, the second rack positioned over the first rack when the warming rack is in the collapsed configuration and positioned in the horizontal orientation, the second rack further including a stop arm configured to engage the second front support rod of the first rack when the warming rack is in the expanded configuration.

22. The warming rack of claim 21, wherein the stop arm is located below the crosswise rods of the second rack when the warming rack is in the expanded configuration and positioned in the horizontal orientation, wherein engagement of the stop arm with the second front support rod prevents the second rack from moving downward relative to the first rack when the warming rack is in the expanded configuration and positioned in the horizontal orientation.

23. The warming rack of claim 21, wherein the second front support rod is located below the first front support rod.

24. The warming rack of claim 21, wherein the crosswise rods of the second rack are interleaved relative to the crosswise rods of the first rack when the warming rack is in the collapsed configuration and positioned in the horizontal orientation.

25. The warming rack of claim 21, wherein the crosswise rods of the first rack and the crosswise rods of the second rack collectively provide a first planar warming surface when the warming rack is in the expanded configuration and positioned in the horizontal orientation, wherein the crosswise rods of the second rack provide a second planar warming surface when the warming rack is in the collapsed configuration and positioned in the horizontal orientation, and wherein a depth of the second planar warming surface is less than a depth of the first planar warming surface.

26. A warming rack configured to be coupled to a cookbox of a grill, the warming rack comprising:
a first rack configured to be coupled to the cookbox, the first rack including a front support rod, a rear support rod, a right support rod, a left support rod, and a plurality of crosswise rods, the rear support rod spaced apart from the front support rod, the right support rod extending between the front support rod and the rear support rod, the right support rod forming a first retention loop, the left support rod spaced apart from the right support rod and extending between the front support rod and the rear support rod, the left support rod forming a second retention loop, respective ones of the crosswise rods of the first rack extending between the front support rod and the rear support rod; and
a second rack coupled to the first rack, the second rack including a first support rod, a second support rod, a right support rod end portion, a left support rod end portion, and a plurality of crosswise rods, the second support rod spaced apart from the first support rod, the right support rod end portion extending outwardly from a right side of the second rack, the right support rod end portion extending through and retained by the first retention loop, the left support rod end portion extending outwardly from a left side of the second rack, the left support rod end portion extending through and retained by the second retention loop, respective ones of the crosswise rods of the second rack extending between the first support rod and the second support rod, the second rack movable relative to the first rack to transition the warming rack between an expanded configuration and a collapsed configuration, the second rack positioned forward of the first rack when the warming rack is in the expanded configuration and positioned in a horizontal orientation, the second rack positioned over the first rack when the warming rack is in the collapsed configuration and positioned in the horizontal orientation.

27. The warming rack of claim 26, wherein the front support rod of the first rack is a first front support rod of the first rack, the first rack further including a second front support rod located below the first front support rod, wherein the second rack includes a stop arm configured to engage the second front support rod when the warming rack is in the expanded configuration.

28. The warming rack of claim 27, wherein the stop arm is located below the crosswise rods of the second rack when the warming rack is in the expanded configuration and positioned in the horizontal orientation, wherein engagement of the stop arm with the second front support rod prevents the second rack from moving downward relative to the first rack when the warming rack is in the expanded configuration and positioned in the horizontal orientation.

29. The warming rack of claim 26, wherein the crosswise rods of the second rack are interleaved relative to the crosswise rods of the first rack when the warming rack is in the collapsed configuration and positioned in the horizontal orientation.

30. The warming rack of claim 26, wherein the crosswise rods of the first rack and the crosswise rods of the second rack collectively provide a first planar warming surface when the warming rack is in the expanded configuration and positioned in the horizontal orientation, wherein the crosswise rods of the second rack provide a second planar warming surface when the warming rack is in the collapsed configuration and positioned in the horizontal orientation, and wherein a depth of the second planar warming surface is less than a depth of the first planar warming surface.

* * * * *